United States Patent
Anopchenko et al.

(10) Patent No.: US 10,698,134 B2
(45) Date of Patent: Jun. 30, 2020

(54) FIELD-EFFECT TUNABLE EPSILON-NEAR-ZERO ABSORBER

(71) Applicant: BAYLOR UNIVERSITY, Waco, TX (US)

(72) Inventors: Oleksiy Anopchenko, Waco, TX (US); Ho Wai Howard Lee, Waco, TX (US)

(73) Assignee: Baylor University, Waco, TX (US)

( * ) Notice: Subject to any disclaimer, the term of this patent is extended or adjusted under 35 U.S.C. 154(b) by 139 days.

(21) Appl. No.: 15/977,686

(22) Filed: May 11, 2018

(65) Prior Publication Data

US 2018/0329114 A1 Nov. 15, 2018

Related U.S. Application Data

(60) Provisional application No. 62/504,985, filed on May 11, 2017.

(51) Int. Cl.
*G02B 1/00* (2006.01)
*G02F 1/015* (2006.01)

(52) U.S. Cl.
CPC ............. *G02B 1/002* (2013.01); *G02F 1/015* (2013.01); *G02F 2001/0155* (2013.01); *G02F 2203/10* (2013.01)

(58) Field of Classification Search
CPC ....... A61B 3/14; A61B 3/0008; A61B 3/0025; A61B 3/12; A61B 5/0013
See application file for complete search history.

(56) References Cited

U.S. PATENT DOCUMENTS

2016/0349594 A1 12/2016 Wurtz et al.
2019/0033682 A1* 1/2019 Kafaie Shirmanesh ..................... G02F 1/292

FOREIGN PATENT DOCUMENTS

| CN | 102610923 A | 7/2012 |
|---|---|---|
| WO | 2015179834 A1 | 11/2015 |
| WO | 2015187221 A2 | 12/2015 |

OTHER PUBLICATIONS

Silveirinha, M. G., Alu, A., Edwards, B., Engheta, N., "Overview of Theory and Applications of Epsilon-Near-Zero Materials", http://www.ursi.org/proceedings/procGA08/papers/B01p6.pdf, 4 pages.

(Continued)

*Primary Examiner* — Wen Huang
(74) *Attorney, Agent, or Firm* — Jackson Walker, LLP

(57) ABSTRACT

The present disclosure provides a system and method for a tunable ENZ material that can vary the absorption of radiant energy. The tunable ENZ material can act as a broadband absorber advantageously using a stack of ultrathin conducting layers having an epsilon-near-zero (ENZ) regime of permittivity at different wavelengths. The conducting materials can include at least partially transparent conducting oxide or transition metal nitride layers with different electron concentrations and hence different ENZ frequencies for a broadband range of energy absorption. The layer(s) can be directly tuned to various frequencies to achieve high levels of absorption at deep subwavelength ENZ thicknesses. An applied electric bias can create electron accumulation/depletion regions in an ENZ semiconductor device and allows control of plasma frequency and hence high levels of absorption in the device. Further, for a stack of layers, the carrier concentration can be altered from layer to layer.

21 Claims, 17 Drawing Sheets

(56) References Cited

OTHER PUBLICATIONS

Alu, A., Silveirinha, M.G., Salandrino, A., Engheta, N., "Epsilon-Near-Zero (ENZ) Metamaterials and Electromagnetic Sources: Tailoring the Radiation Phase Pattern", https://pdfs.semanticscholar.org/c507/a683ec3be8015bd1eba17c62acaee1f709b3.pdf, Apr. 15, 2007, 15 pages, vol. 75, Issue 15, Article 155410.

Davoyan, A. R., Mahmoud, A. M., Engheta, N., "Optical isolation with epsilon-near-zero metamaterials", https://www.osapublishing.org/DirectPDFAccess/9DBC5CBF-CB37-4A13-AC7574B02203EBEF_248908/oe-21-3-3279.pdf?da=1&id=248908&seq=0&mobile=no, Jan. 19, 2013, pp. 3279-3286, vol. 21, No. 3, Optics Express, Philadelphia, USA.

Kats, M.A., Blanchard, R., Ramanathan, S., Capasso, F., "Thin-Film Interference in Lossy, Ultra-Thin Layers", https://www.seas.harvard.edu/capasso/wp-content/uploads/publications/40-47-thinfilm-jan-5.pdf, , Jan. 2014, pp. 40-47, Optics & Photonics News.

Babicheva, V., Boltasseva, A., Lavrinenko, A., "Transparent conducting oxides for electro-optical plasmonic modulators", http://orbit.dtu.dk/files/115238305/Lavrinenko_Nanophotonics.pdf, 2015, pp. 165-185.

"Metamaterials Market Size, Analysis, Trends, Report, Share, Investment Opportunities and Forecast to 2022", http://www.abnewswire.com/pressreleases/metamaterials-market-size-analysis-trends-report-share-investment-opportunities-and-forecast-to-2022_100535.html, Feb. 21, 2017, 3 pages.

"Telecommunication to be the first commercial application segment for Metamaterials", https://www.marketsandmarkets.com/ResearchInsight/metamaterials.asp, 2 pages, Markets and Markets Research Private Ltd.

"Optical Coating Market by Technology, (IAD, E-Beam Evaporation, Sputtering Process and Vacuum Deposition), by Type, End-Use Industry & by Region—Trends and Forecasts to 2020", http://www.marketsandmarkets.com/Market-Reports/optical-coating-market-128999548.html, Feb. 2016, 13 pages.

Koch, U., Hoessbacher C.,Niegemann, J., Hafner, C., Leuthold, J., "Digital Plasmonic Absorption Modulator Exploiting Epsilon-Near-Zero in Transparent Conducting Oxides", IEEE Photonics Society, Feb. 2016, 14 pages, vol. 8, No. 1.

Luk, T.S., Campione, S., Kim, I., Feng, S., Jun, Y. C., Liu, S., Wright, J.B., Catrysse, P. B., Fan, Shanhui, Sinclair, M.B., "Directional perfect adsorption using deep subwavelength low permittivity films", Physical Review B, Aug. 11, 2014, 14 pages, vol. 90, Issue 8, American Physical Society.

Vassant, S., Hugonin, J., Marquier, F., Greffet, J., "Berreman mode and epsilon near zero mode", Optics Express, Oct. 8, 2012, pp. 23971-23977, vol. 20, No. 21.

Foley IV, J., Harutyunyan, H., Rosenmann, D., Divan, R., Wiederrecht, G.P., Gray, S.K., "When are Surface Plasmon Polaritons Excited in the Kretschmann-Raether Configuration?", Scientific Reports, Apr. 15, 2015, 5 pages, vol. 5:9929.

Shi, K., Lu, Z., "Filed-effect optical modulation based on epsilon-near-zero conductive oxide", Optics Communications 370, 2016, pp. 22-28.

Kim, T.Y., Badsha, MD. A., Yoon, J., Lee, S.Y., Jun, Y.C., Hwangbo, C.K., "General Strategy for Broadband Coherent Perfect Absorption and Multi-wavelength All-optical Switching Based on Epsilon-Near-Zero Multilayer Films", Scientific Reports, Mar. 11, 2016, 11 pages, vol. 6:22941.

Ma, Z., Li, Z., Liu, K., Ye, C., Sorger, V.J., "Indium-Tin-Oxide for High-performance Electro-optic Modulation", Nanophotonics, 2015, pp. 198-213, vol. 4.

Papadakis, G.T., Atwater, H.A., "Field effect-induced tunability in planner hyperbolic metamaterials", PhysRevB.92.184101, Chapter II.A. Electronic properties: High strength dielectrics and TCOs, Jul. 23, 2015, 20 pages.

Anopchenko, A., Tao, L., Arndt, C., Lee, H.W.H., "Field-Effect Tunable and Broadband Epsilon-Near-Zero Perfect Absorbers with Deep Subwavelength Thickness", ACS Photonics, 2018, pp. 2631-2637, Vol. 5.

Naik, G. V., Liu, J., Kildishev, A.V., Shalaev, V.M., Boltasseva, A., "Demonstration of Al:ZnO as a plasmonic component for near-infrared metamaterials", Proceedings of the National Academy of Sciences (PNAS), May 18, 2012, pp. 8834-8838, vol. 109, No. 23.

Ribarov, J., International Search Report for International Patent Application No. PCT/US2018/032342, dated Sep. 17, 2018, European Patent Office.

Diot, P., Written Opinion for International Patent Application No. PCT/US2018/032342, dated Sep. 17, 2018, European Patent Office.

\* cited by examiner

FIELD-EFFECT TUNABLE EPSILON-NEAR-ZERO ABSORBER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to epsilon-near-zero materials ("ENZ"), such as for energy absorptance of radiant energy. More specifically, the disclosure relates to nano-thickness layers of ENZ materials, including conducting materials having an epsilon-near-zero (ENZ) regime of permittivity at a given wavelength, for high efficiency energy absorptance.

Description of the Related Art

Light harvesting and high-resolution optical technologies demand optical coatings with strong light absorption. High levels ("perfect") absorption typically requires high optical loss, large thicknesses, or usage of constructed nano- and meta-materials. Most optical dielectric materials, such as glasses, are transparent in the visible and infrared regions. Contrastingly, metals reflect light due to high optical losses. Because neither class of materials provides a satisfactory solution, there is a significant interest in developing of new optical materials in which absorption can be engineered by modification of the material properties. The relative new efforts in metamaterials are viewed as an option for light harvesting and absorption, because their precise shape, geometry, size, orientation and arrangement creates material properties that are viewed by some as being unachievable with conventional materials. Engineers are able manipulate light wave propagation by arranging the unit cells in different ways based on the application of the materials. However, the technology is complex and expensive.

Recent studies suggest that epsilon-near-zero (ENZ) materials can be useful to make high performance ultrathin film absorbers. Ultrathin ENZ layers support radiative Berreman (above light line) and bound ENZ (below light line) modes. Excitation of these modes leads to resonant light absorption. ENZ materials generally are considered to include semiconductors heavily doped with metals or semi-metals. Examples of ENZ materials include at least partially transparent conducting oxides (TCO), such as Indium Tin Oxide (ITO) and Aluminium Zinc Oxide (AZO) and transition metal nitrides and others. The permittivity in the ENZ materials changes with different frequencies from a permittivity of metals through a region of little to no permittivity (ENZ regime) to a permittivity of dielectric materials. The very low group velocity of an electromagnetic wave in ENZ materials inhibits energy removal from an excitation volume and leads to increased fields and the high loss function. If electric permittivity is described by the Drude model $\varepsilon = \varepsilon\infty - \omega_p^2/(\omega^2 + i\gamma\omega)$, where $\omega_p$ is the plasma frequency and $\gamma$ is the electron collision rate, then ENZ ($Re(\varepsilon)=0$) frequency is $\omega_{ENZ} \approx \omega_p$ for $\gamma \to 0$ and the loss function $L(\omega_{ENZ}) \approx \omega_p/\gamma \to \infty$. ENZ materials have intrinsic optical loss $\gamma \ll \omega_p$ and plasma frequency that can be engineered by controlling deposition conditions and typically high carrier concentration from $10^{19}$ to $10^{21}$ cm$^{-3}$. For example, TCO materials can exhibit ENZ regimes at telecom wavelengths of 1.3 to 1.5 μm, among others.

Therefore, there remains a need for an improved system and method using ENZ materials that can provide high levels of broadband absorptance for energy in the visible, near-IR, and UV region.

BRIEF SUMMARY OF THE INVENTION

The present disclosure provides a system and method for a tunable ENZ material that can vary the absorption of radiant energy. The tunable ENZ material can act as a broadband absorber advantageously using a stack of ultrathin conducting layers having an epsilon-near-zero (ENZ) regime of permittivity at different wavelengths. The conducting materials can include at least partially transparent conducting oxide or transition metal nitride layers with different electron concentrations and hence different ENZ frequencies for a broadband range of energy absorption. The layer(s) can be directly tuned to various frequencies to achieve high levels of absorption at deep subwavelength ENZ thicknesses. An applied electric bias can create electron accumulation/depletion regions in an ENZ semiconductor device and allows control of plasma frequency and hence high levels of absorption in the device. Further, for a stack of layers, the carrier concentration can be altered from layer to layer.

The highly effective absorbers may be used as light harvesting technologies, solar energy collectors, steam generators and boilers, water distillation, thermal emitters, efficient radiation detectors, optical coatings including very low reflectance coatings to reduce stray reflections, lasers, high-resolution optical instruments, cameras, CMOS sensors and other sensors, polarizers, as an ultrathin nonlinear optical medium, magneto-optical devices, and other applications. The highly effective absorbers can also boost the quality of high-resolution cameras and cooling down sensitive electronics. The nonlinear ENZ medium may also advance the design of reconfigurable and tunable nonlinear devices for ultrafast nanoscale communication, imaging, and display technologies.

The disclosure provides an electronic device, comprising: at least one layer of a conducting material having an epsilon-near-zero (ENZ) regime of permittivity at a given wavelength and configured to be tunable to vary the permittivity with applied electrical bias.

The disclosure provides an electronic device, comprising: a stack of a plurality of conducting layers having an epsilon-near-zero (ENZ) regime of permittivity at a given wavelength with at least two of the layers having different ENZ regimes and configured to absorb light at different frequencies.

The disclosure provides a method of using an electronic device having at least one layer of a conducting material having an epsilon-near-zero (ENZ) regime of permittivity at a given wavelength, the method comprising: applying electrical bias to the device; and tuning the device to absorb various frequencies of light.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 10 is a schematic graph of an electron density at an oxide-ITO interface of a simulated MOS field-effect perfect absorber at an applied bias.

DETAILED DESCRIPTION

Figure 1A:
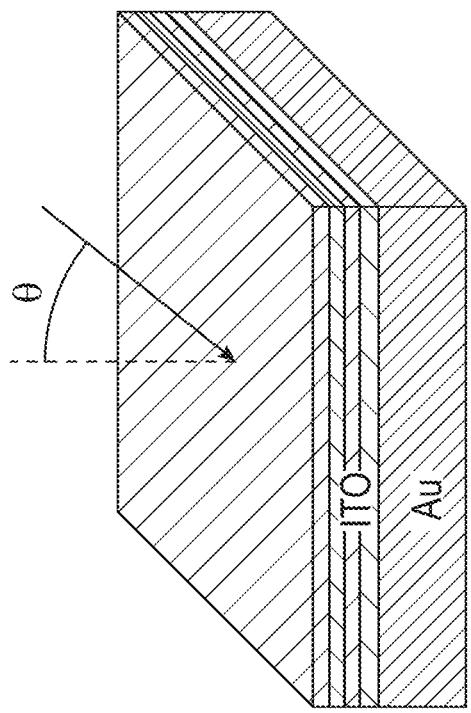
FIG. 1A is a schematic diagram of an example of a multilayer stack with a metal reflector distal in the stack from an initial incidence with a light.

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation or location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The order of steps can occur in a variety of sequences unless otherwise specifically limited. The various steps described herein can be combined with other steps, interlineated with the stated steps, and/or split into multiple steps. Some elements are nominated by a device name for simplicity and would be understood to include a system or a section, such as a processor would encompass a processing system of related components that are known to those with ordinary skill in the art and may not be specifically described.

The present disclosure provides a system and method for a tunable ENZ material that can vary the absorption of radiant energy. The tunable ENZ material can act as a broadband absorber advantageously using a stack of ultrathin conducting layers having an epsilon-near-zero (ENZ) regime of permittivity at different wavelengths. The conducting materials can include at least partially transparent conducting oxide or transition metal nitride layers with different electron concentrations and hence different ENZ frequencies for a broadband range of energy absorption. The layer(s) can be directly tuned to various frequencies to achieve high levels of absorption at deep subwavelength ENZ thicknesses. An applied electric bias can create electron accumulation/depletion regions in an ENZ semiconductor device and allows control of plasma frequency and hence high levels of absorption in the device. Further, for a stack of layers, the carrier concentration can be altered from layer to layer.

Figure 1B:
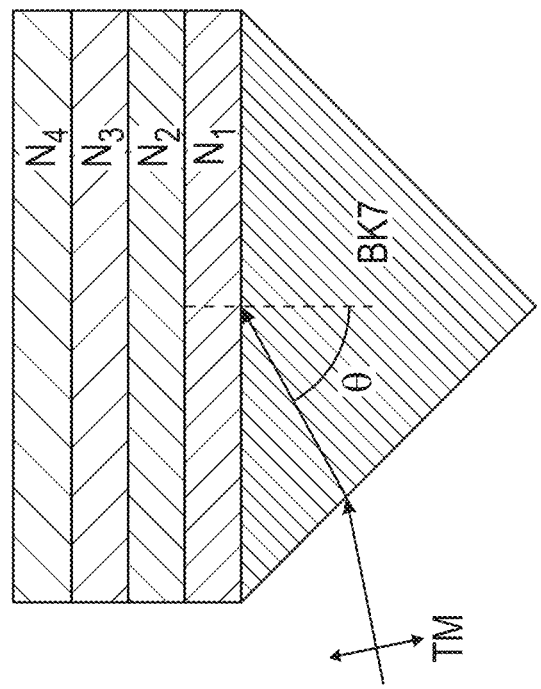
FIG. 1B is a schematic diagram of another example of a multilayer stack with a high index material at an initial incidence with a light.
Figure 1C:
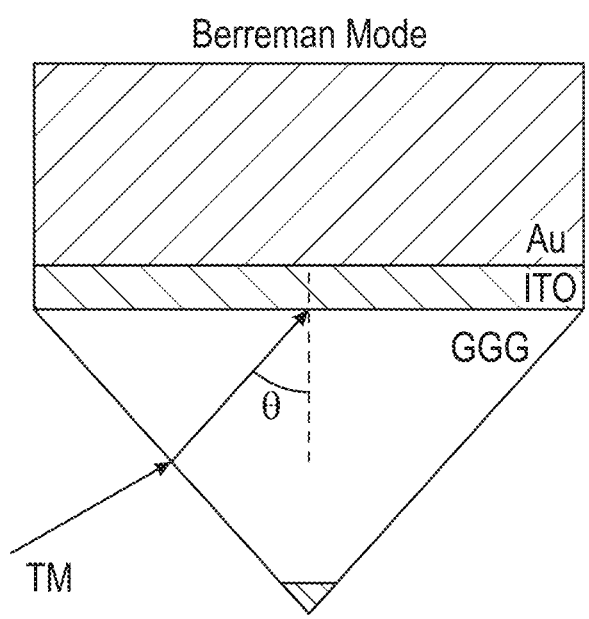

FIG. 1A is a schematic diagram of an example of a multilayer stack with a metal reflector distal in the stack from an initial incidence with a light. FIG. 1B is a schematic diagram of another example of a multilayer stack qwth a hiqh refractive index (herein "high index") material at an initial incidence with a light. FIG. 1C is a schematic diagram of another example of a single layer with a high index material at an initial incidence with a light, A broadband absorber example has been constructed by using a stack of ultrathin ITO layers with gradually different electron concentration and hence, different ENZ frequencies. The ultrathin ENZ layers support radiative Berreman and bound ENZ modes. Excitation of these modes in two different light incidence configurations leads to resonant absorption.

It is believed that the design advantageously provides functional, tunable devices compared to a fixed design; relatively easy fabrication compared to constructed metamaterials; large areas of usable material compared to complex engineered nanostructures of metamaterials having limited area; and ultrathin devices with an total stack thickness example of about 100 nm or less, about 40 nm or less, about 20 nm or less, or about 10 nm or less, and any value or less therebetween.

Figure 10:
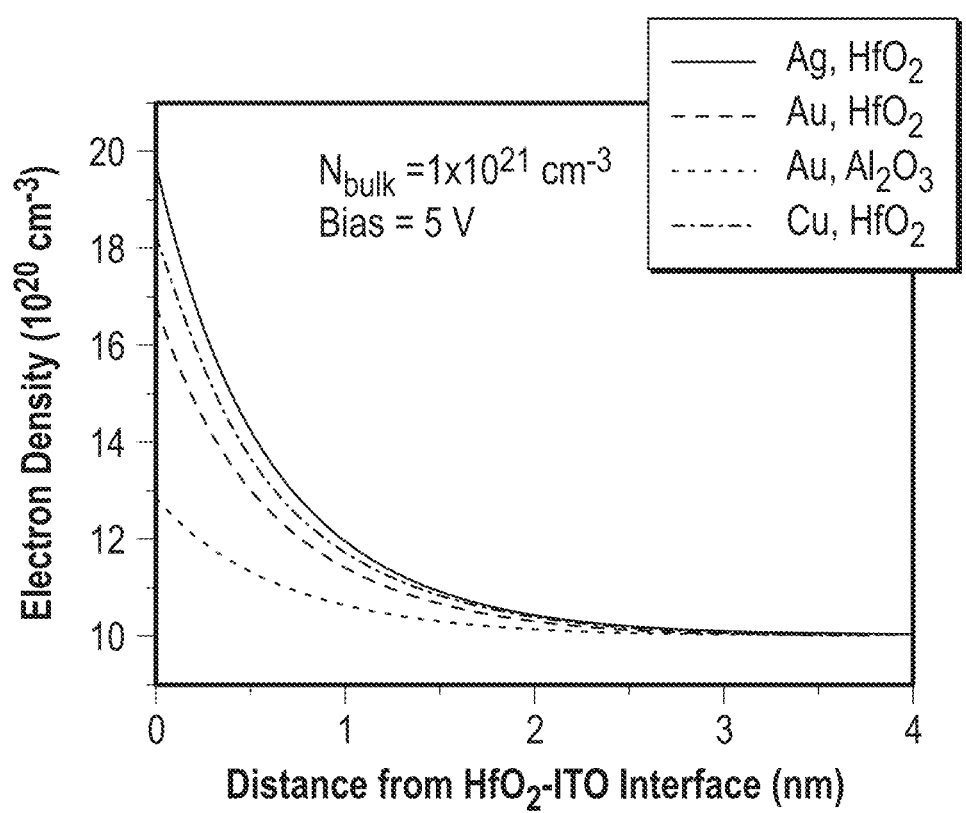
FIG. 10 is a schematic diagram of another example of a single layer with a high index material at an initial incidence with a light.

The ENZ multilayer stack examples illustrated in FIGS. 1A and 1B are composed of four ITO nanolayers, labelled N1-N4 in FIG. 1B with corresponding layers shown in FIG. 1A. The nanoscale ITO multilayer stack could be fabricated, for example, by the atomic layer deposition. The layer N1 is the ENZ layer through which incidence light at an angle θ initially enters the ENZ stack. In FIG. 1A, the electron concentration decreases, and ENZ wavelength increases, from the top to the bottom of the multilayer stack. The ENZ multilayer stack in FIG. 1A is supported, for example, by a thick gold reflector. In FIG. 1B, the electron concentration decreases, and ENZ wavelength increases, from the bottom to the top of the multilayer stack. The ENZ multilayer stack in FIG. 1B is supported, for example, by a prismatic thick high index glass. FIG. 10 shows a prismatic thick high index glass (such as gadolinium gallium garnet "GGG") with an ITO layer and a metal reflector (such as gold). FIG. 10 incorporates elements of FIGS. 1A and 1B and would be another illustration of a radiative Berreman mode of excitation. The figure illustrates a single layer between the high index glass and metal reflector, and the illustrated structure can be modified to be a multilayer stack.

An ultrathin layer is responsive to applying electrical bias because an accumulation of electrons in the accumulation region of the layer has more effect on an ultrathin layer rather than a thick layer that is less responsive. The thickness of a layer can be considered a subwavelength thickness, including without limitation, thicknesses of about $\frac{1}{50}$ times or less of the wavelength, $\frac{1}{75}$ times or less of the wavelength, or about $\frac{1}{100}$ times or less of the wavelength, and any thickness or less therebetween. Alternatively, the thickness of a layer can be expressed as a ratio of an accumulation region of the layer, described in more detail below. A ratio of a layer thickness to the accumulation region thickness in the layer, without limitation, can be 20:1 or less, 10:1 or less, 5:1 or less, 1:1 or less, and any ratios or less therebetween. As a further alternative, the thickness of a layer can be expressed in simple measurement values, such as 40 nm or less, 20 nm or less, 10 nm or less, 8 nm or less, 5 nm or less, 2 um or less, and any value or less therebetween.

While the structure example advantageously shows a stack of layers, it is to be understood that the principles disclosed herein can be applied to a single layer. A single ultrathin layer could be made with a predetermined material and carrier concentration for absorption of a desired frequency in an ENZ region. The single layer could be doped or otherwise formed to be capable of tuning absorption capabilities by applying different amounts of electrical bias to affect the ENZ region in the layer.

The stack of layers provides an enhanced range of ENZ regions and hence broadens the range of absorption of given light through the stack. Electrical bias applied to the stack generally affects a layer's accumulation region, affecting that layer's ENZ region and absorption and the resulting absorption of the stack.

Example 1

The p-polarized (TM) light absorptance as a function of the incidence angle and ITO thickness and wavelength are shown in these FIGS. 2A-2F. The absorptance is calculated using IMD software. The optical properties of the ITO are modelled using a free electron Drude model. An intensity scale bar is on the right of several figures.

Figure 2A:
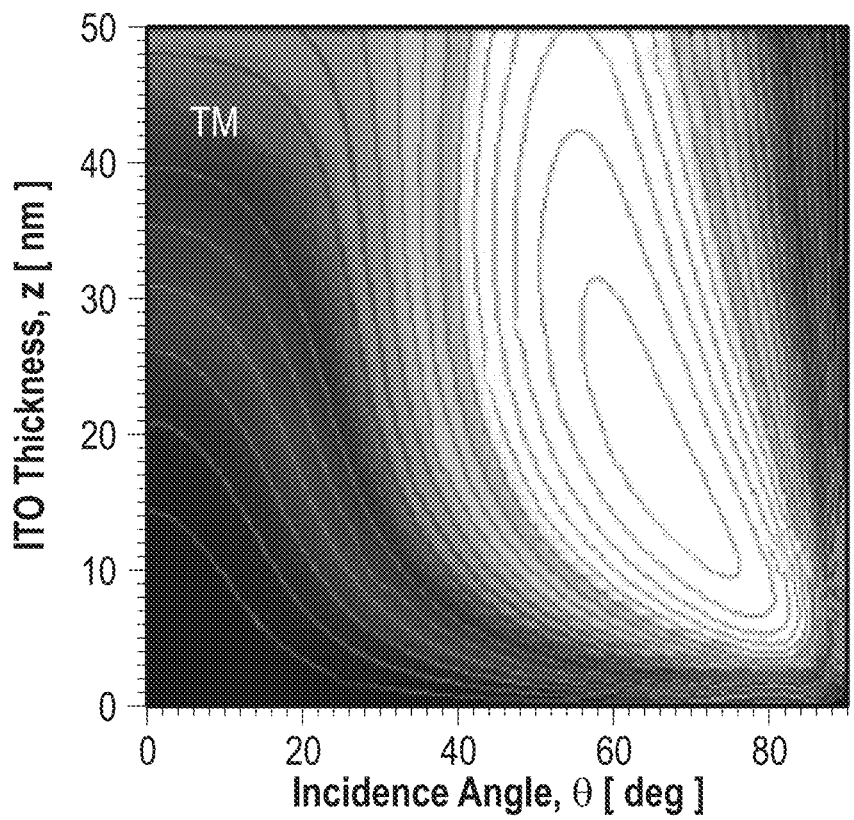
FIG. 2A is a schematic graph of the absorptance of the ENZ multilayer stack example shown in FIG. 1A due to the p-polarized excitation of the radiative Berreman mode for variable thicknesses compared to variable incidence angles at a fixed excitation wavelength.

FIG. 2A is a schematic graph of the absorptance of the ENZ multilayer stack example shown in FIG. 1A due to the p-polarized (TM) excitation of the radiative Berreman mode for variable thicknesses compared to variable incidence angles at a fixed excitation wavelength. For example, carrier concentrations of the ITO nanolayers are $N1=1\times10^{21}$ cm$^{-3}$, $N2=8\times10^{20}$ cm$^{-3}$, $N3=6.1\times10^{20}$ cm$^{-3}$, and $N4=4.9\times10^{20}$ cm$^{-3}$. The absorptance is attributed to the excitation of the radiative Berreman mode for the structure. The excitation wavelength is fixed at 1020 nm as an example. The graph shows that the highest absorption can be achieved with the ITO thickness between about 10-30 nm in the ENZ multilayers.

Figure 2B:
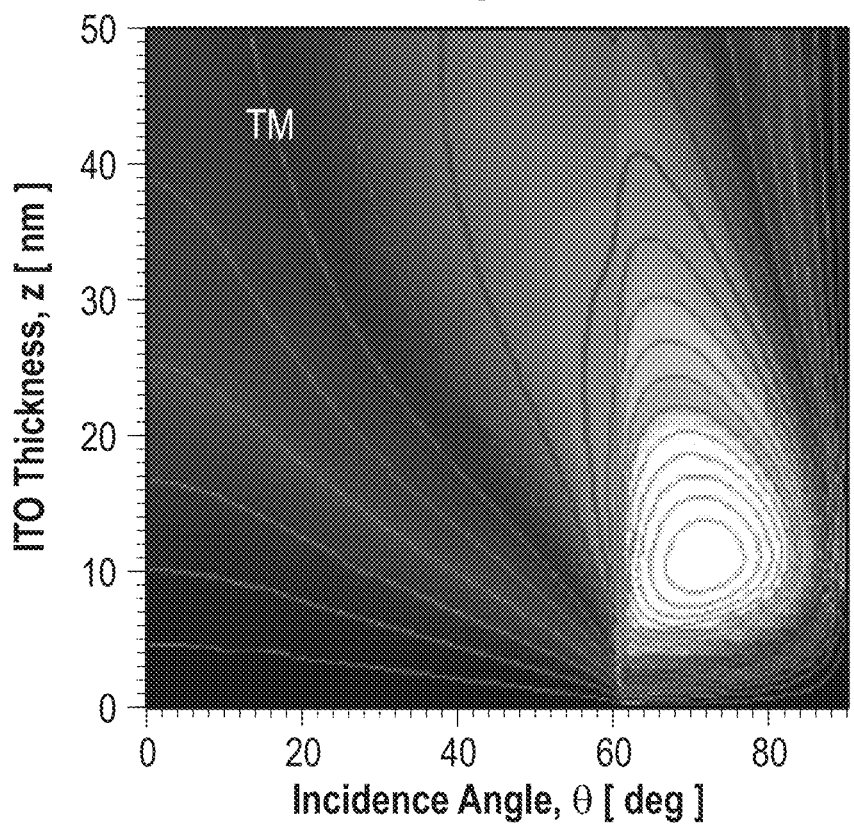
FIG. 2B is a schematic graph of the absorptance of the ENZ multilayer stack example shown in FIG. 1B due to the p-polarized excitation of the bound ENZ mode for variable thicknesses compared to variable incidence angles at a fixed excitation wavelength.

FIG. 2B is a schematic graph of the absorptance of the ENZ multilayer stack example shown in FIG. 1B due to the p-polarized excitation of the bound ENZ mode for variable thicknesses compared to variable incidence angles at a fixed excitation wavelength. The absorptance is attributed to the excitation of the bound ENZ mode in the Kretschmann-Raether configuration. A Kretschmann-Raether configuration is used to achieve resonance between light and free electrons of the metal surface. In this configuration, a prism of high dielectric material with a high refractive index is interfaced with a metal film. Light from a source propagates through the prism is made incident on the metal film. As a consequence of the total incident reflection, some leaks through the metal film, forming an evanescent wave in the dielectric medium. The evanescent wave penetrates a characteristic distance into the less optically dense medium where it is attenuated. The excitation wavelength is fixed at 1540 nm, for example. The graph shows the highest absorption can be achieved between about 8-12 nm in the ENZ multilayers, thus narrowed around very small thicknesses compared to the results in FIG. 2A.

Figure 2C:
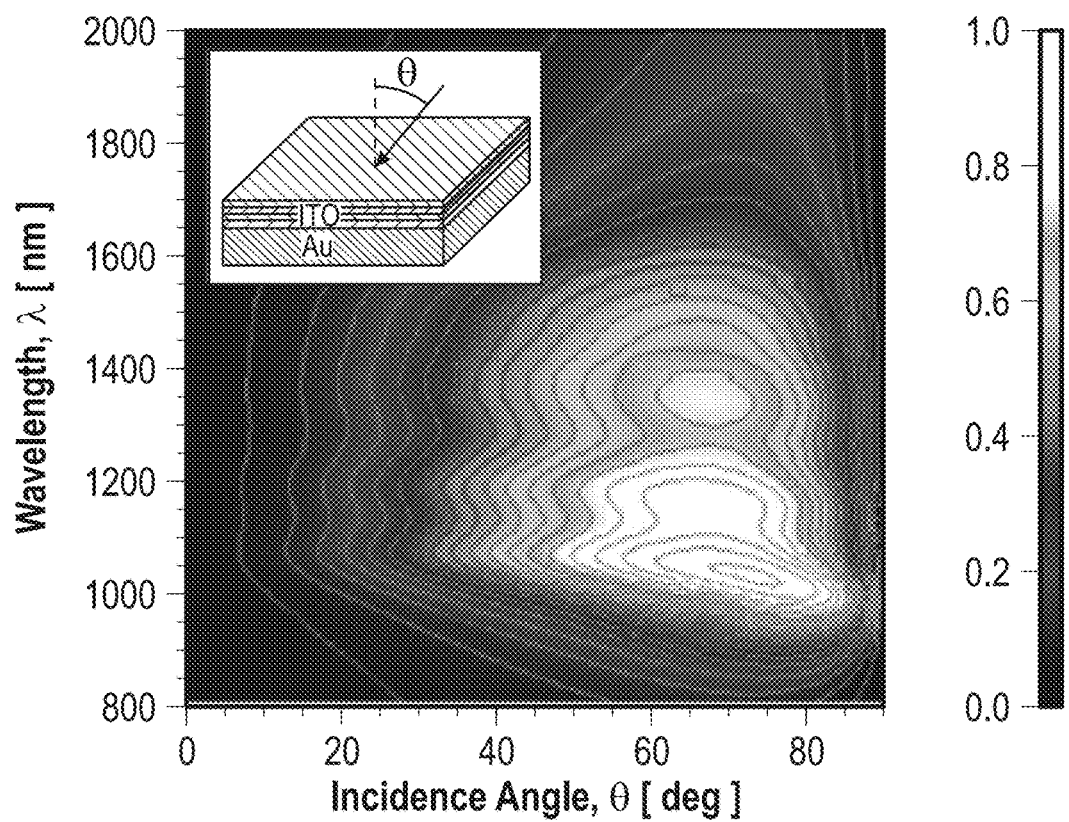
FIG. 2C is another schematic graph of the absorptance of the ENZ multilayer stack example shown in FIG. 1A due to the p-polarized excitation of the radiative Berreman mode for variable wavelengths compared to variable incidence angles.

FIG. 2C is another schematic graph of the absorptance of the ENZ multilayer stack example shown in FIG. 1A due to the p-polarized excitation of the radiative Berreman mode for variable wavelengths compared to variable incidence angles. For the exemplary purposes, the four ITO layer thicknesses are equal and fixed at 11 nm. A change in frequency results in a relatively small range of incidence angles and vice versa to achieve a high level of absorptance. The absorptance of greater than 95% is observed for the multilayer stack.

Figure 2D:
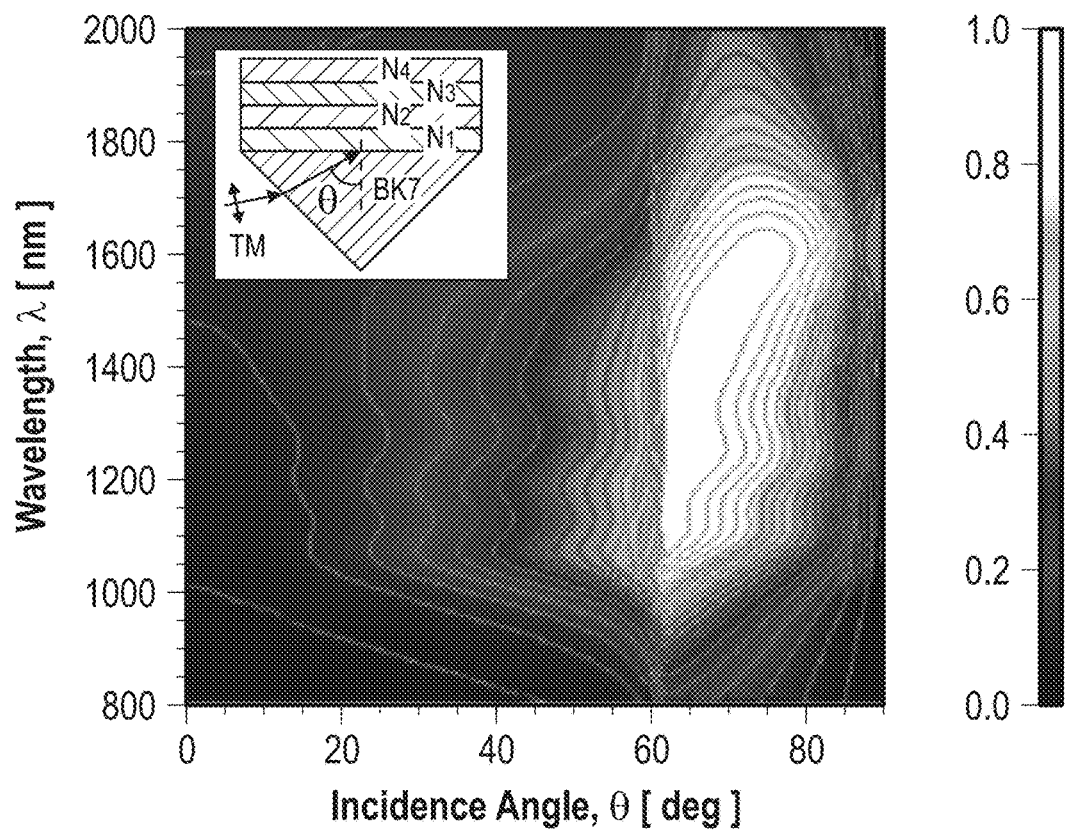
FIG. 2D is another schematic graph of the absorptance of the ENZ multilayer stack example shown in FIG. 1B due to the p-polarized excitation of the bound ENZ mode for variable wavelengths compared to variable incidence angles.

FIG. 2D is another schematic graph of the absorptance of the ENZ multilayer stack example shown in FIG. 1B due to the p-polarized excitation of the bound ENZ mode for variable wavelengths compared to variable incidence angles. As an example, the four ITO layer thicknesses are equal and fixed at 11 nm. The exemplary parameters result in resonant light absorption above the incidence angle of about 60 degrees. The optimum level of absorption extends over a broader wavelength range of 1000-1,500 nm than the absorption due to the Berreman mode shown in FIG. 2C. The absorptance of greater than 95% is observed for the multilayer stack.

Figure 2E:
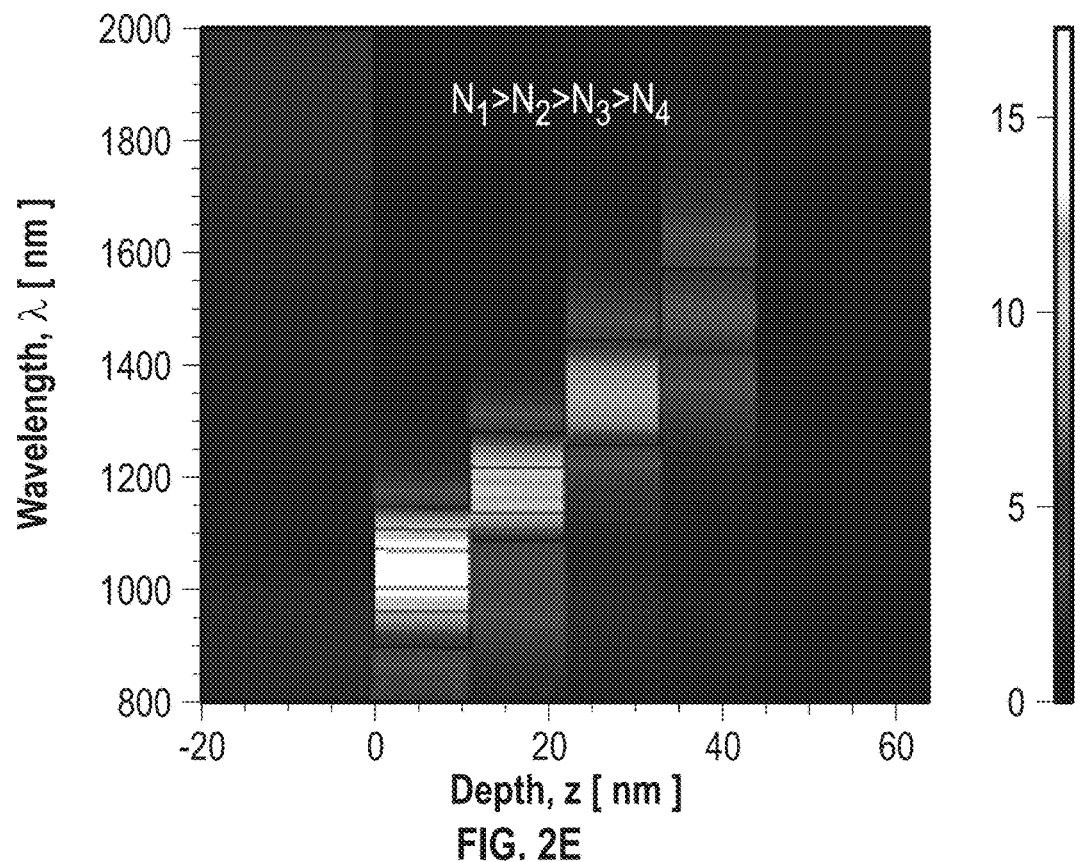
FIG. 2E is a schematic graph of the electric field intensity across the ENZ multilayer stack example shown in FIG. 1A for variable wavelengths at a fixed incidence angle.

FIG. 2E is a schematic graph of the electric field intensity across the ENZ multilayer stack example shown in FIG. 1A for variable wavelengths for each layer at a fixed incidence angle. The incidence angle was 64 degrees, for example. A zero depth corresponds to the multilayer surface facing the incident light.

Figure 2F:
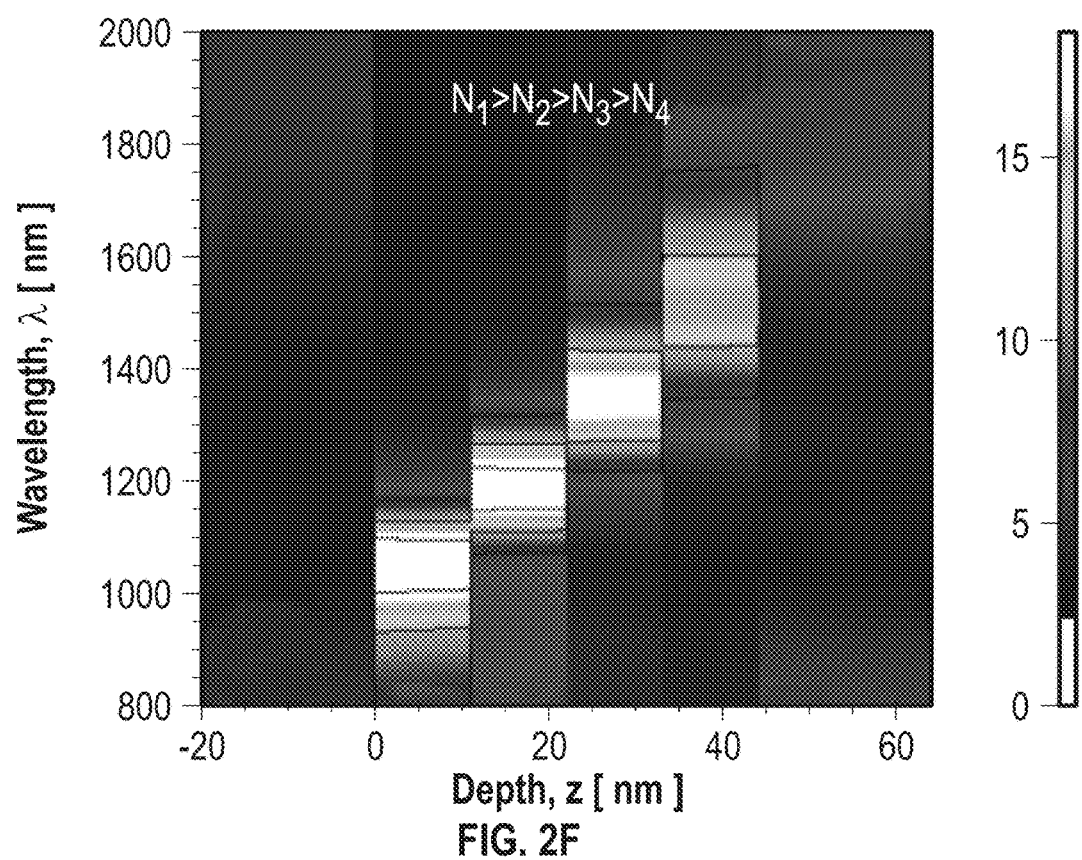
FIG. 2F is a schematic graph of the electric field intensity across the ENZ multilayer stack example shown in FIG. 1B for variable wavelengths at a fixed incidence angle.

FIG. 2F is a schematic graph of the electric field intensity across the ENZ multilayer stack example shown in FIG. 1B for variable wavelengths for each layer at a fixed incidence angle. The incidence angle was 64 degrees, for example. A zero depth corresponds to the multilayer surface facing the incident light. There is a large field intensity enhancement in the inner ITO layers at the ENZ wavelengths.

Figure 2G:
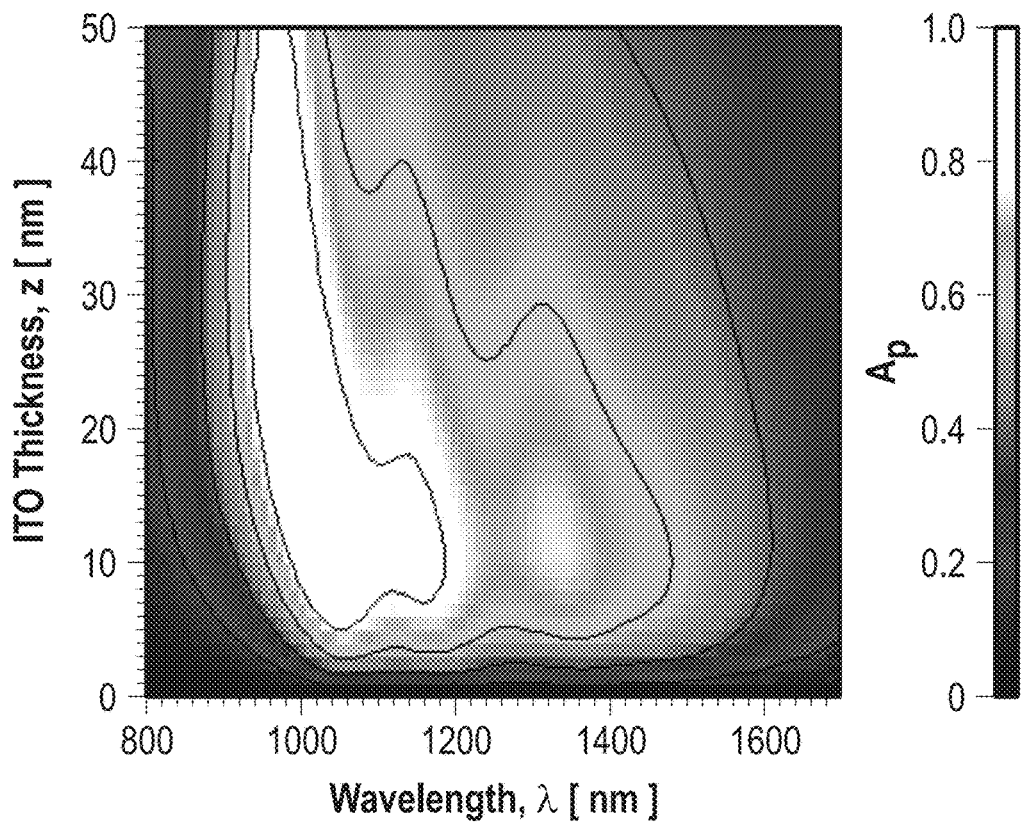
FIG. 2G is a schematic graph of the absorptance of the ENZ multilayer stack shown in FIG. 1A due to the p-polarized excitation of the radiative Berreman mode for variable thicknesses compared to variable excitation wavelengths at a fixed incidence angle.

FIG. 2G is a schematic graph of the absorptance of the ENZ multilayer stack shown in FIG. 1A due to the p-polarized excitation of the radiative Berreman mode for variable thicknesses compared to variable excitation wavelengths at a fixed incidence angle. The incidence angle was 70 degrees. The broadband absorption can be achieved with the ITO thickness of ~10-30 nm in the ENZ multilayers.

Figure 2H:
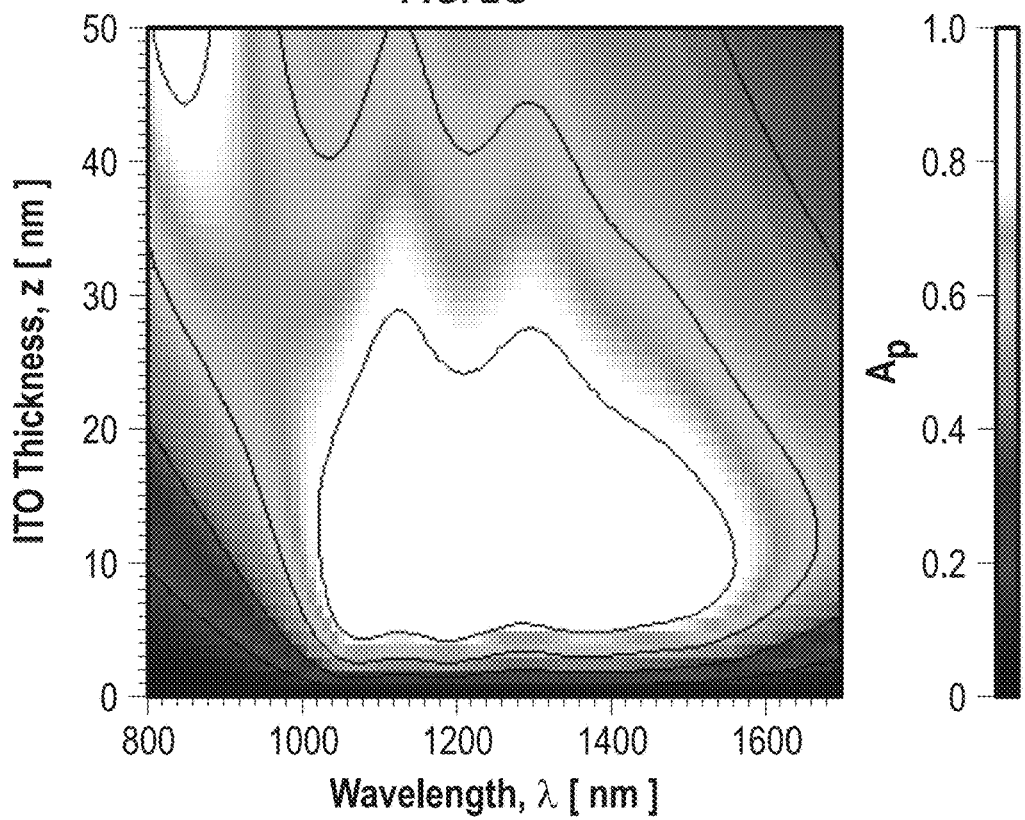
FIG. 2H is a schematic graph of the absorptance of the ENZ multilayer stack example shown in FIG. 1B due to the p-polarized excitation of the bound ENZ mode for variable thicknesses compared to variable excitation wavelengths at a fixed incidence angle.

FIG. 2H is a schematic graph of the absorptance of the ENZ multilayer stack example shown in FIG. 1B due to the p-polarized excitation of the bound ENZ mode for variable thicknesses compared to variable excitation wavelengths at a fixed incidence angle. The incidence angle was 35 degrees. The graph shows high absorption (90% or more, preferably 95% or more, and more preferably 99% or more) with a bandwidth of about 1000-1500 nm.

Figure 3A:
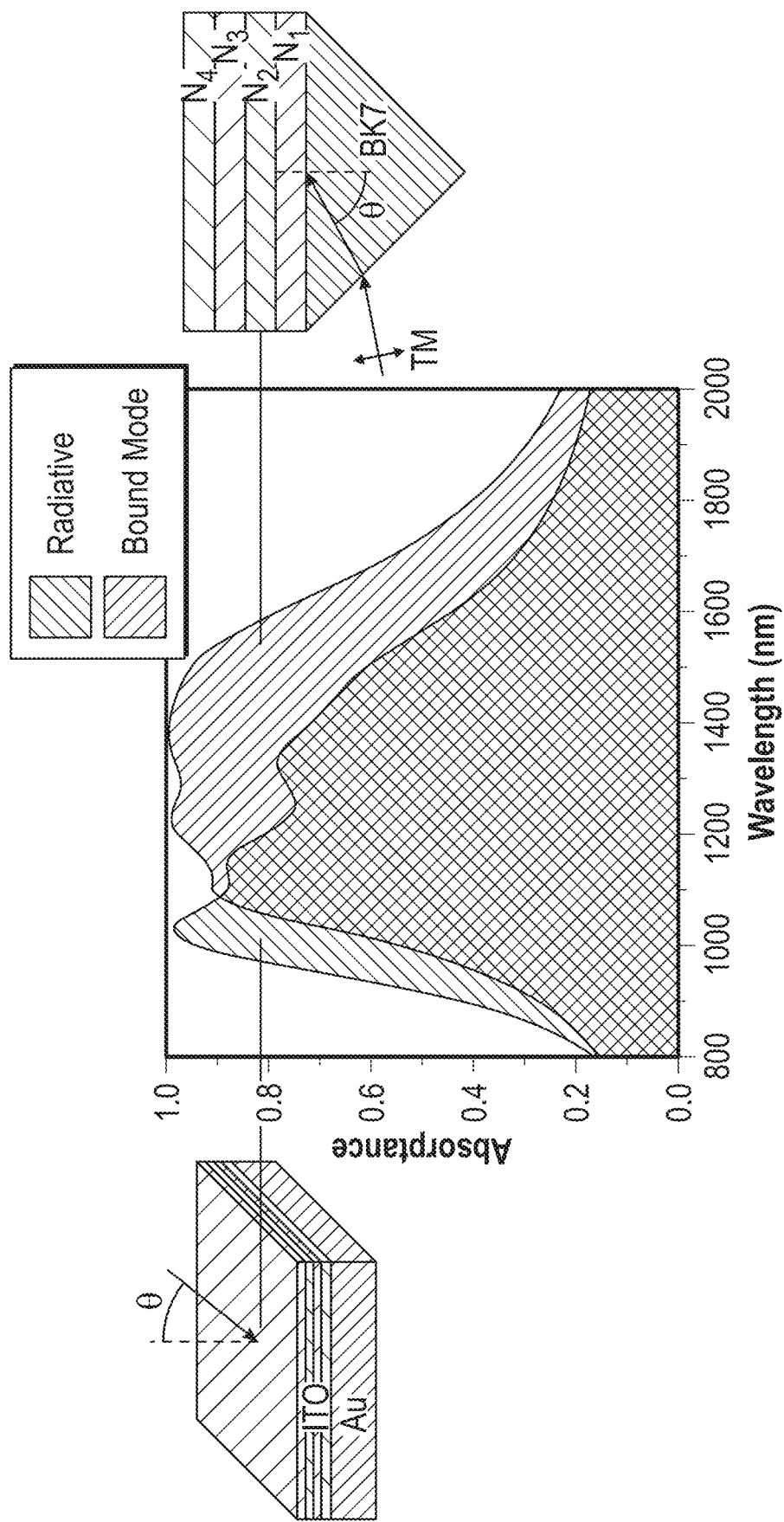
FIG. 3A is a schematic graph of the absorptance spectra comparing the radiative Berreman mode and the bound ENZ mode.

FIG. 3A is a schematic graph of the absorptance spectra comparing the radiative Berreman mode and the bound ENZ mode. Starting from the left, the first curve represents the radiative Berreman mode results, and the second curve represents the bound ENZ mode results. For example, the layers were 8 nm thick ITO layers. The graph shows that the high level of absorption could be found in a very small thickness of material. The graph also shown that the bound ENZ mode extends absorptance over a broadband wavelength range of 1.1-1.6 µm compared to a narrower range in the Berreman mode. An absorptance of greater than 95% for more than 500 nm wavelength range is shown for the bound ENZ mode.

Figure 3B:
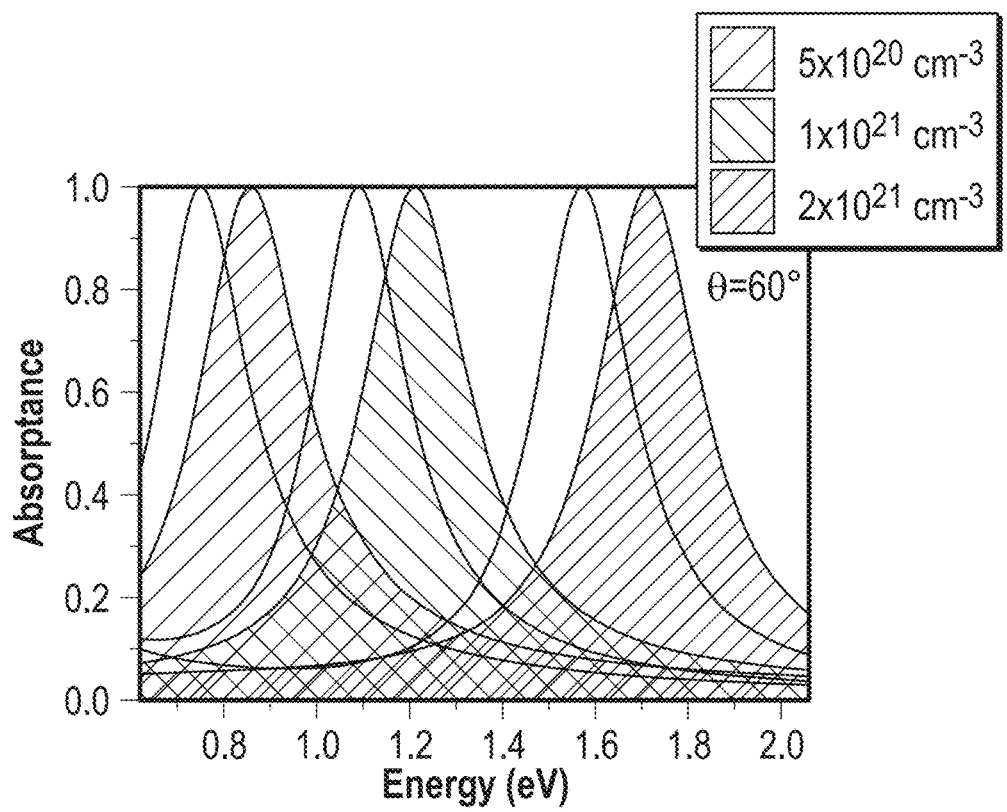
FIG. 3B is a schematic graph of absorptance compared to incident light energy of three examples of nanolayers with varying electron densities.
Figure 3C:
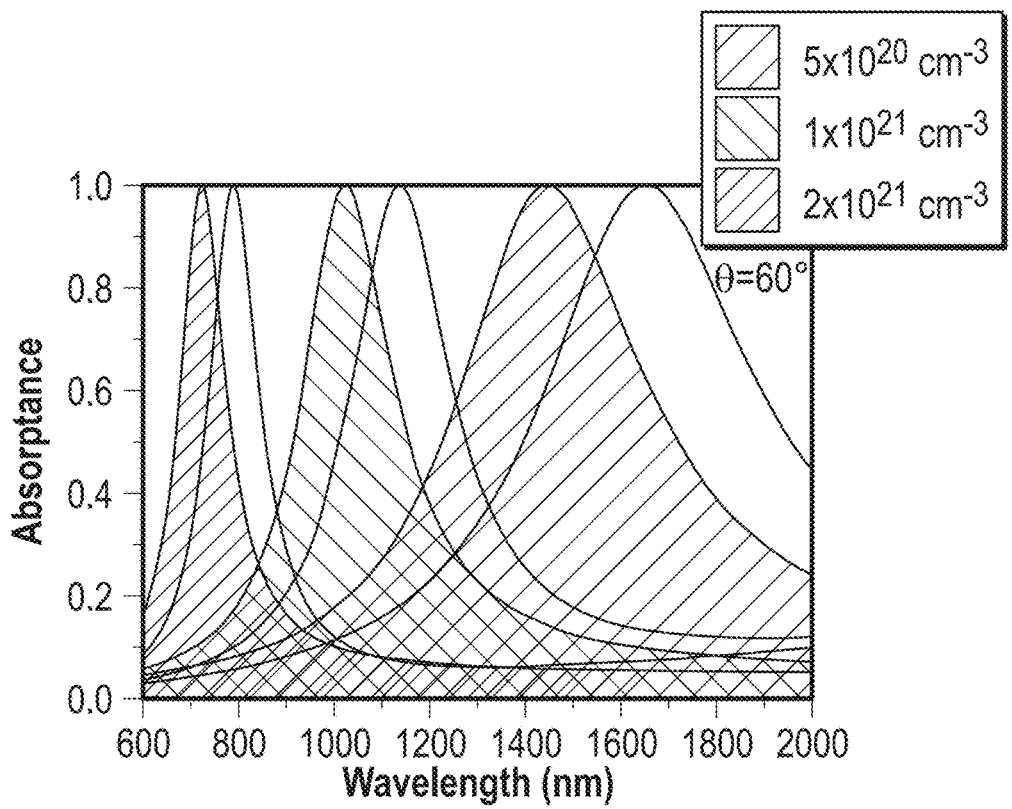
FIG. 3C is a schematic graph of absorptance compared to incident light wavelength of the three examples of nanolayers with varying electron densities of FIG. 3B.

FIG. 3B is a schematic graph of absorptance compared to incident light energy of three examples of nanolayers with varying electron densities. FIG. 3C is a schematic graph of absorptance compared to incident light wavelength of the three examples of nanolayers with varying electron densities of FIG. 3B. Without limitation and for example, the material is ITO with electron densities of $5\times10^{20}$ cm$^{-3}$, $1\times10^{21}$ cm$^{-3}$, and $2\times10^{21}$ cm-3 at an incidence angle of 60°. The shaded regions represent the radiative Berreman modes. The lines without the shading represent bound ENZ modes. Absorptance width is proportional to the electron collision rate in the Drude model of electrical permittivity.

Example 2

Figure 4A:
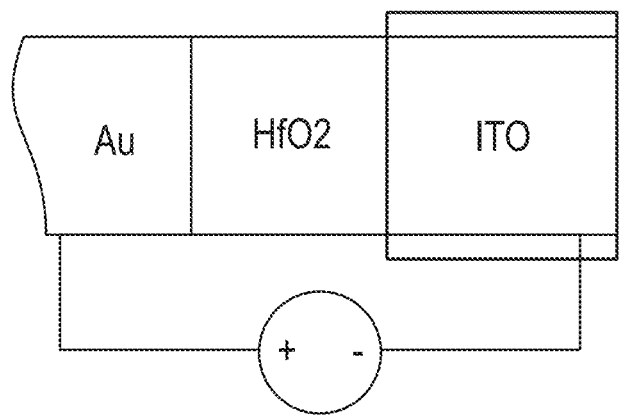
FIG. 4A is a schematic diagram of a metal-oxide-semiconductor (MOS) structure example having an ENZ layer that is field-effect tunable.

FIG. 4A is a schematic diagram of a metal-oxide-semiconductor (MOS) structure example having an ENZ layer that is field-effect tunable. The tunable absorption can be enabled by the field-effect. The MOS configuration can be similar to an electronic field-effect transistor with a TCO. Electron accumulation occurs in the TCO at the TCO-insulator interface, when a bias is applied between the metal and TCO. The electron accumulation modifies the complex dielectric constant of the TCO. Electron accumulation increases plasma and ENZ frequency and therefore leads to a blue shift of the absorption peak in wavelength. A commercial device simulator that self-consistently solves the Poisson and drift-diffusion equations was used to calculate electron distribution in the MOS device.

Figure 4B:
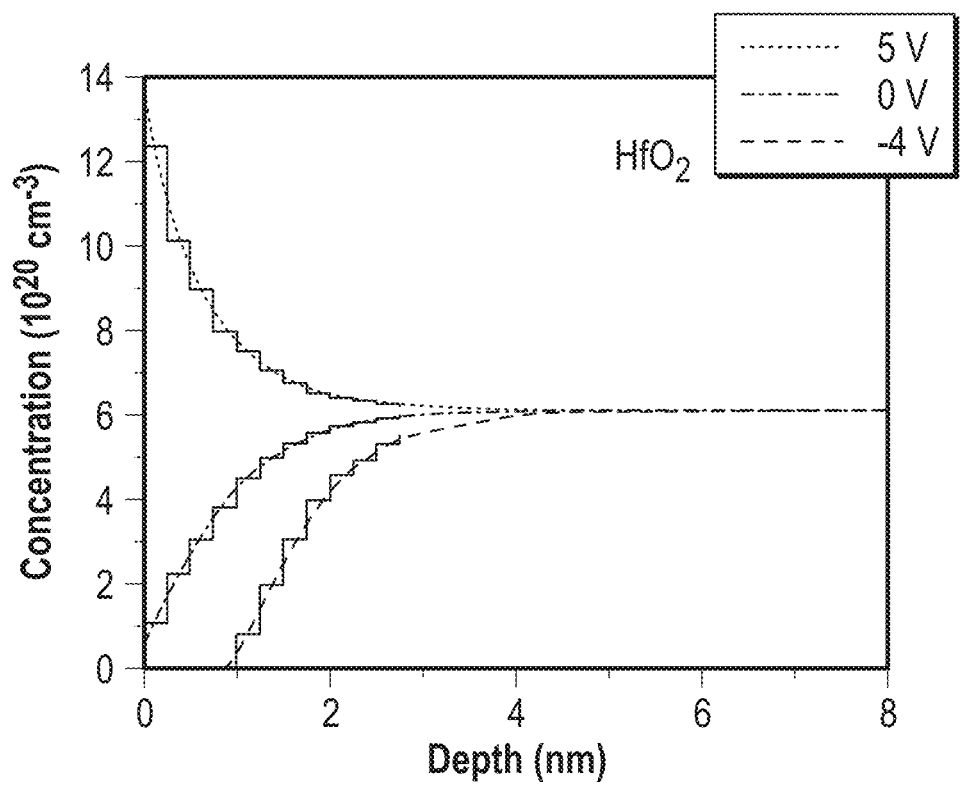
FIG. 4B is a schematic graph of a spatial distribution example of a carrier concentration N for different applied voltages across the ENZ layer shown in FIG. 4A.

FIG. 4B is a schematic graph of a spatial distribution example of an electron concentration N for different applied voltages across the ENZ layer shown in FIG. 4A. The exemplary MOS device includes a metal substrate, single 8-nm-thin ITO layer, and 5-nm-thin dielectric insulator layer between them. The dielectric insulator generally has a high dielectric value, for example hafnium dioxide (HfO$_2$). In this example, the background carrier concentration of the ITO is N0=6×10$^{20}$ cm$^{-3}$. The carrier concentration of ITO at the HfO$_2$/ITO interface increases/decreases significantly compared to the bulk value under an applied bias of 5 V, leading to the change of permittivity εr for different applied biases at a visible or NIR operational wavelength. The dielectric permittivity of ITO substantially changes over the region within about 1-2 nm of the HfO$_2$/ITO interface due to the formation of the depletion/accumulation layer. Thus, "perfect" absorption (herein at least 95%, or advantageously at least about 97%, or more advantageously at least about 99%) is possible in ultrathin nanolayers; having a thickness, t, approaching the space charge region, $\ell_D$, of common MOS devices, such as transistor in a computer, at low applied electric fields:

$t<10$ nm~ $\ell_D$ ≈1-2 nm

Figure 5:
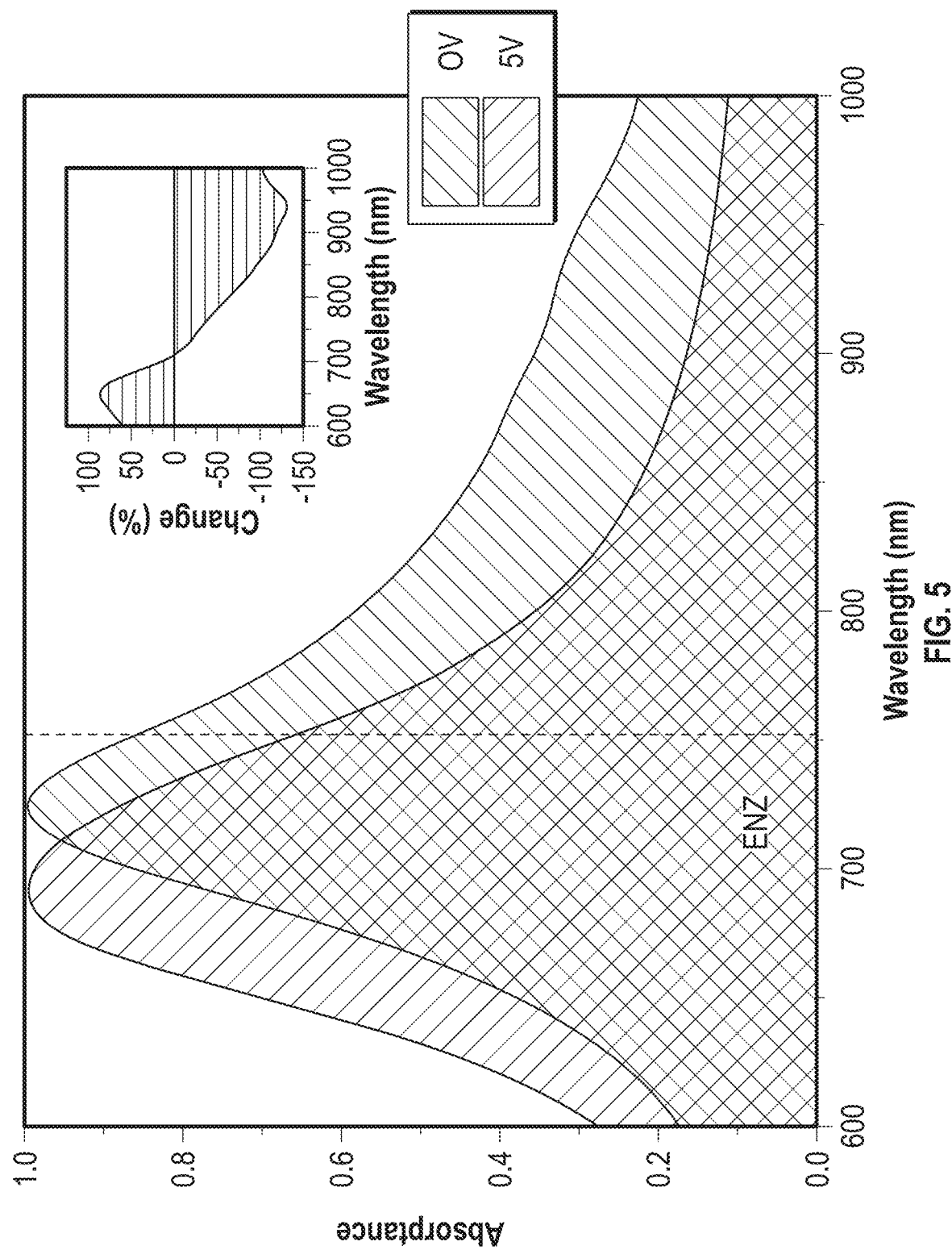
FIG. 5 is a schematic graph of an absorptance example of the ENZ layer similar to the device shown in FIG. 4A for different applied voltages at a fixed incidence angle.

FIG. 5 is a schematic graph of an absorptance example of the ENZ layer similar to the device shown in FIG. 4A for different applied voltages at a fixed incidence angle. The inset shows the absorptance difference in percentage (%). The graph shows the absorptance of an ultrathin 4 nm ITO layer with the electron concentration of 2×10$^{21}$ cm$^{-3}$ and mobility of 31 cm$^2$/(Vs). The incidence medium is TiO$_2$ (rutile) and the light incidence angle is 60 degrees. The bias values are, for example: 5 V biased (left curve) and unbiased (right curve). The vertical dotted line shows an ENZ wavelength.

A larger absorptance change, for example more than 300%, is observed due to larger field enhancement in the accumulation layer. These results open the path to develop ultrathin tunable ENZ absorbers and thin-film modulators.

Example 3

Figure 6A:
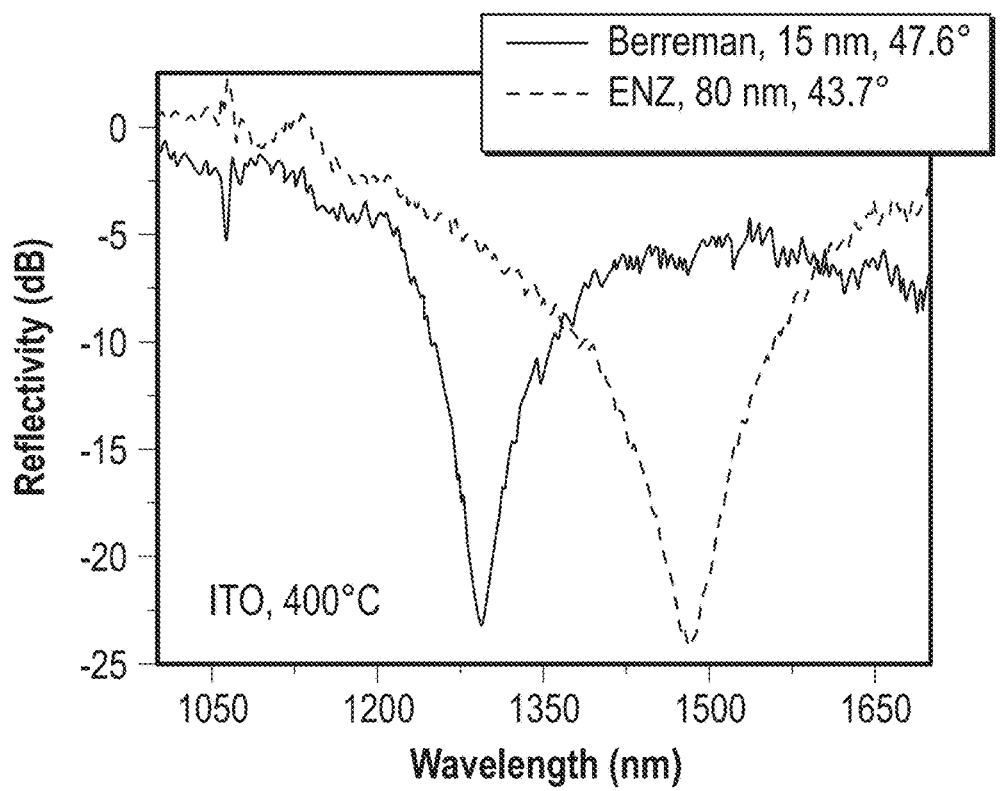
FIG. 6A is a schematic graph of measured absorptance versus wavelengths for a single layer with a high index material at an initial incidence with a light in the structure of FIG. 1B.

FIG. 6A is a schematic graph of measured absorptance versus wavelengths for a single layer with a high index material at an initial incidence with a light in the structure of FIG. 1B. An experiment was made of absorptance and dispersion of ultrathin Berreman and ENZ absorbers.

Figure 6B:
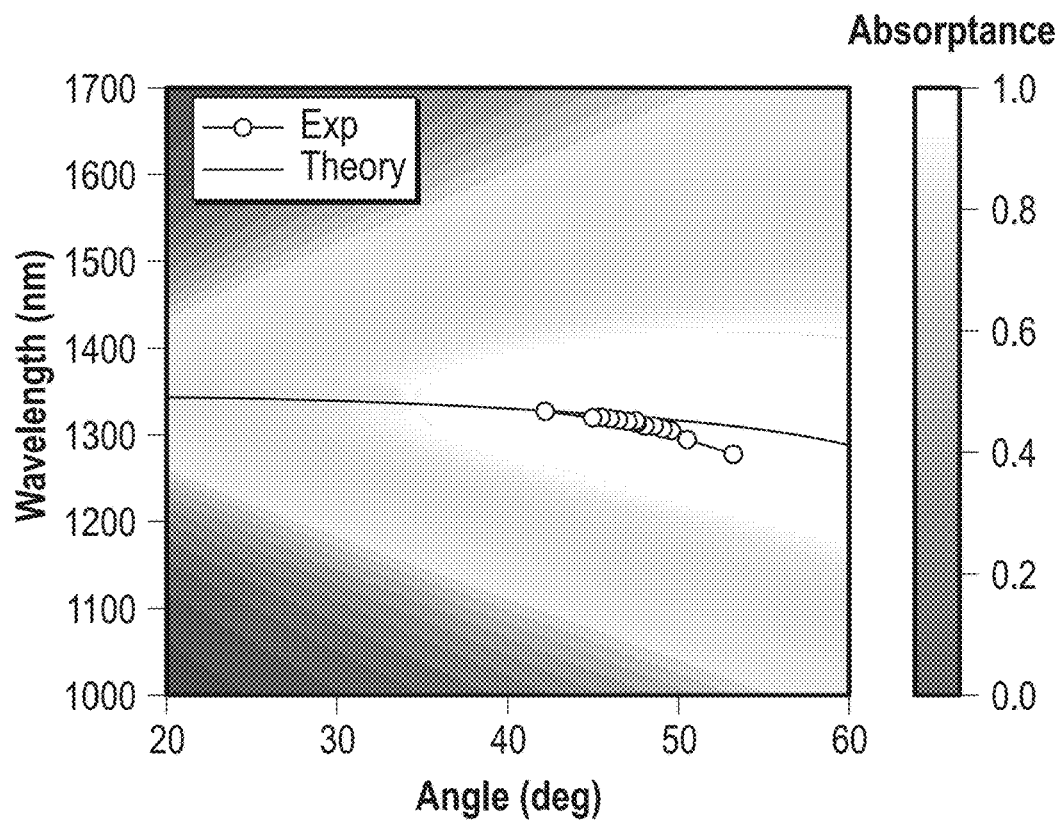
FIG. 6B is a schematic graph of measured and simulated dispersion characteristics of the Berreman mode in a 15 nm thin ITO nanolayer.

FIG. 6B is a schematic graph of measured and simulated dispersion characteristics of the Berreman mode in a 15 nm thin ITO nanolayer.

The ITO films were grown by radio frequency (RF) magneton sputtering on silica substrates. The sputtering temperature and process pressure were 400° C. and 5 mTorr, respectively. The RF power was 50 W and Ar flow rate was 40 sccm.

To measure the absorptance of the samples, linearly polarized and collimated light from a supercontinuum (SC) laser having a broadband wavelength range of 600-1700 nm was incident to the ITO nanolayer by means of a GGG coupling prism in the Kretschmann-Raether configuration, such as shown in FIG. 10. The coupling prism and a test specimen fixture were mounted on a motorized rotary stage (rotation angle of θ). The reflected light from the ITO nanolayer was collected by a multi-mode optical fiber fixed on second rotary stage (rotation angle of 2θ). For both s- and p-polarization state of the incident light, the reflected light was recorded by an optical spectrum analyzer. The setup allowed reflectivity measurements over a broad angular range with an angular accuracy of 0.01°.

FIG. 6A shows experimental specular reflectivity measured from two ITO nanolayers for both Berreman mode (upper line before the dip) and ENZ mode (lower line before the dip) excitation in the Kretschmann-Raether configuration. The Berreman mode can use, for example, a structure as in FIG. 10. The ENZ mode can use, for example, a structure similar to FIG. 1B, but with a single layer. The dip in the reflectivity is due to the ENZ resonance light absorption in the ITO nanolayer. The absorptance of 99.5% (−23 dB) is observed in the ITO nanolayers with subwavelength thicknesses of 15 nm and 80 nm for Berreman and ENZ modes, respectively. The Berreman mode is measured in the 15-nm-thin ITO layer at an angle of incidence of 47.6°, and the ENZ mode is measured in the 80-nm-thin ITO layer at 43.7°. The dispersion characteristic of the measured Berreman mode is plotted in FIG. 6B (shown in circles). The characteristic agrees well with the simulated dependence (shown in line). The small discrepancy can be attributed to a small refractive index mismatch of the index matching liquid and GGG prism. The good agreement for the single layer absorber indicates the accuracy of the analysis.

Example 4

Figure 7A:
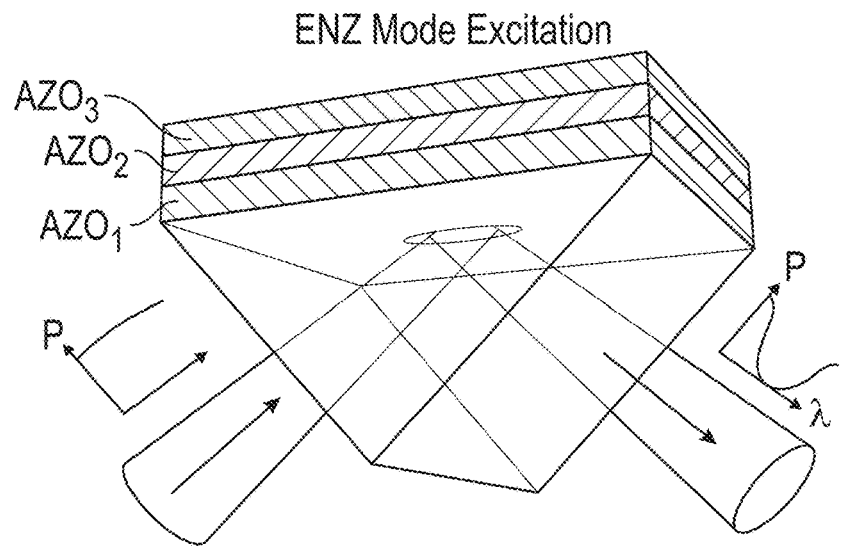
FIG. 7A is a schematic diagram of an ENZ mode excitation in an AZO multilayer Kretschmann-Raether configuration such as shown in FIGS. 1A and 1B.
Figure 7B:
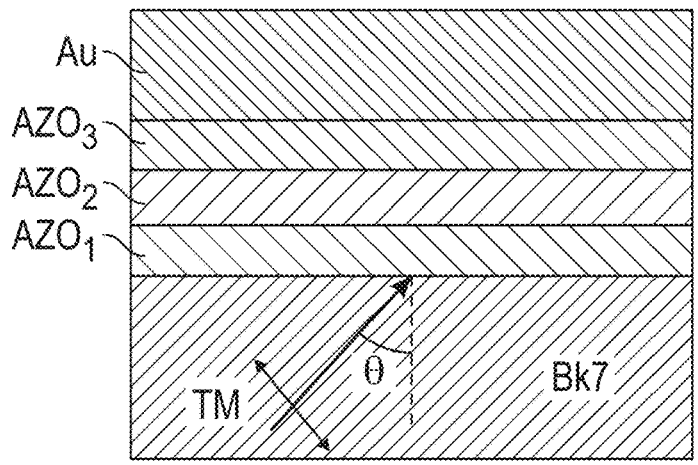
FIG. 7B is a schematic diagram of a radiative Berreman mode in an AZO multilayer configuration such as shown in FIG. 1A.
Figure 7C:
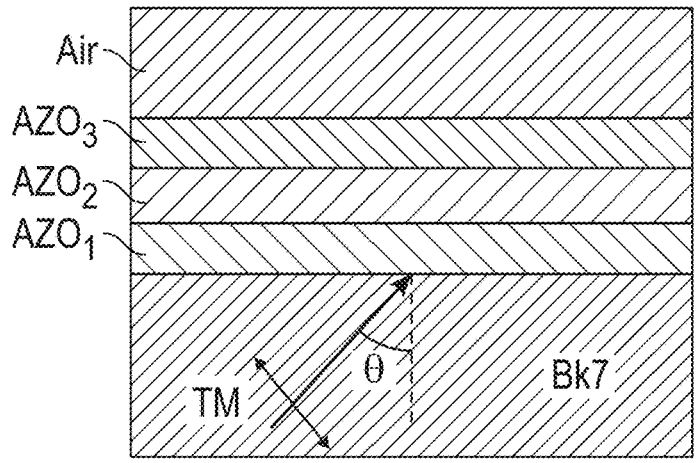
FIG. 7C is a schematic diagram of a bound ENZ mode configuration with a high index material for incident light without the prism shown in FIG. 1B.

FIG. 7A is a schematic diagram of an ENZ mode excitation in an AZO multilayer Kretschmann-Raether configuration such as shown in FIGS. 1A and 1B. FIG. 7B is a schematic diagram of a radiative Berreman mode in an AZO multilayer configuration such as shown in FIG. 1A. FIG. 7C is a schematic diagram of a bound ENZ mode configuration with a high index material for incident light without the prism shown in FIG. 1B.

An experiment was made of absorptance and dispersion of multilayer broadband ENZ "perfect absorbers". The results experimentally demonstrated broadband ENZ absorber with >99% absorption, verifying the experimental feasibility of the broadband perfect absorber design described herein. Al-doped ZnO (AZO) materials were used in this experiment because of the ability to finely control the thicknesses and carrier concentrations of each AZO layer. The AZO nanolayers were grown by atomic layer deposition (ALD), providing ultrathin films with good uniformity and surface smoothness. The thickness and electron concentration of the AZO films deposited by the ALD were controlled by varying the number of deposition cycles and the deposition ratio of diethylzinc-H2O to trimethylaluminium-H2O. Three AZO nanolayers with the deposition ratio of 20:1, 30:1, and 35:1 constitute the broadband absorber, shown in FIGS. 7A-7C. The complex permittivity of the AZO films was measured by ellipsometry on control samples and shown in FIG. 8A, described below. The results show that zero permittivity is located at wavelengths of 1497, 1571, and 1700 nm for the AZO3, AZO2, and AZO1, respectively.

Figure 8A:
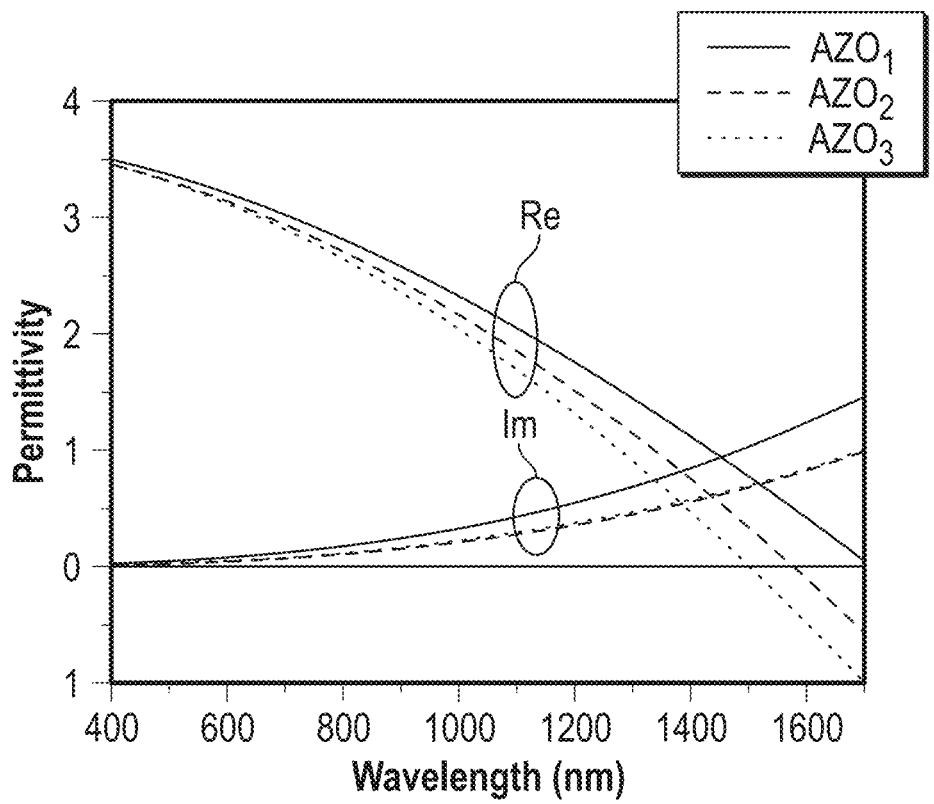
FIG. 8A is a schematic graph of wavelength dependence of the real and imaginary parts of permittivity of each single AZO layer shown in FIGS. 7A-c
Figure 8B:
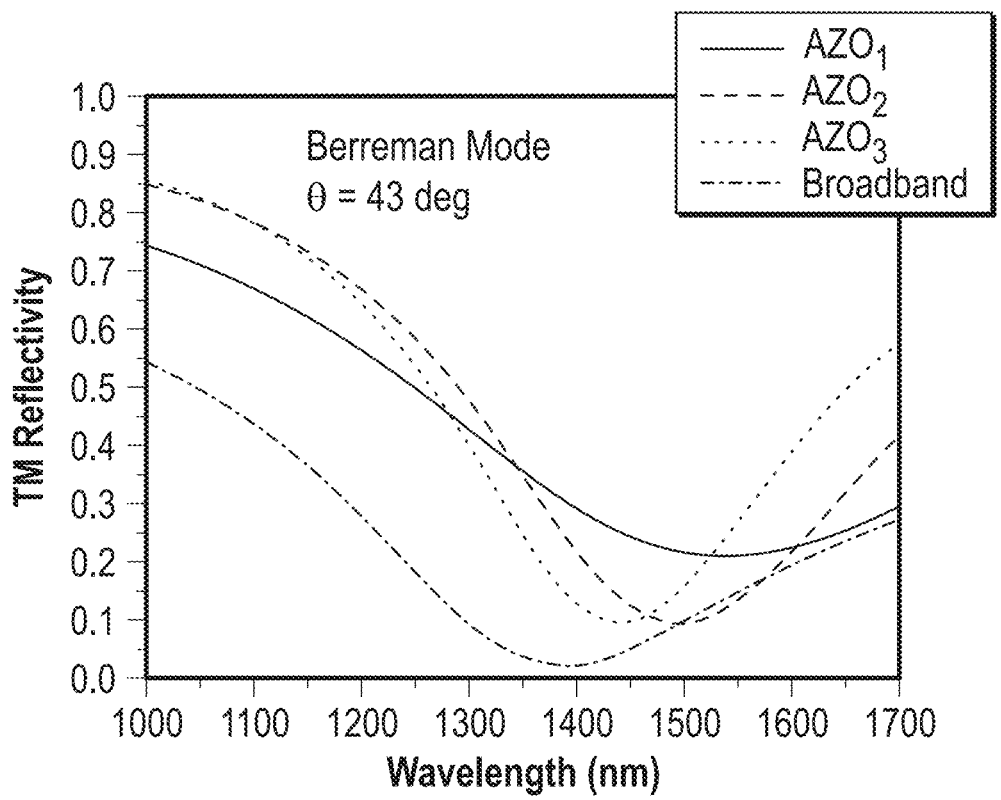
FIG. 8B is a schematic graph of calculated p-polarized (TM) reflectivities of the AZO multilayers in the Berreman mode configuration of FIG. 7B.
Figure 8C:
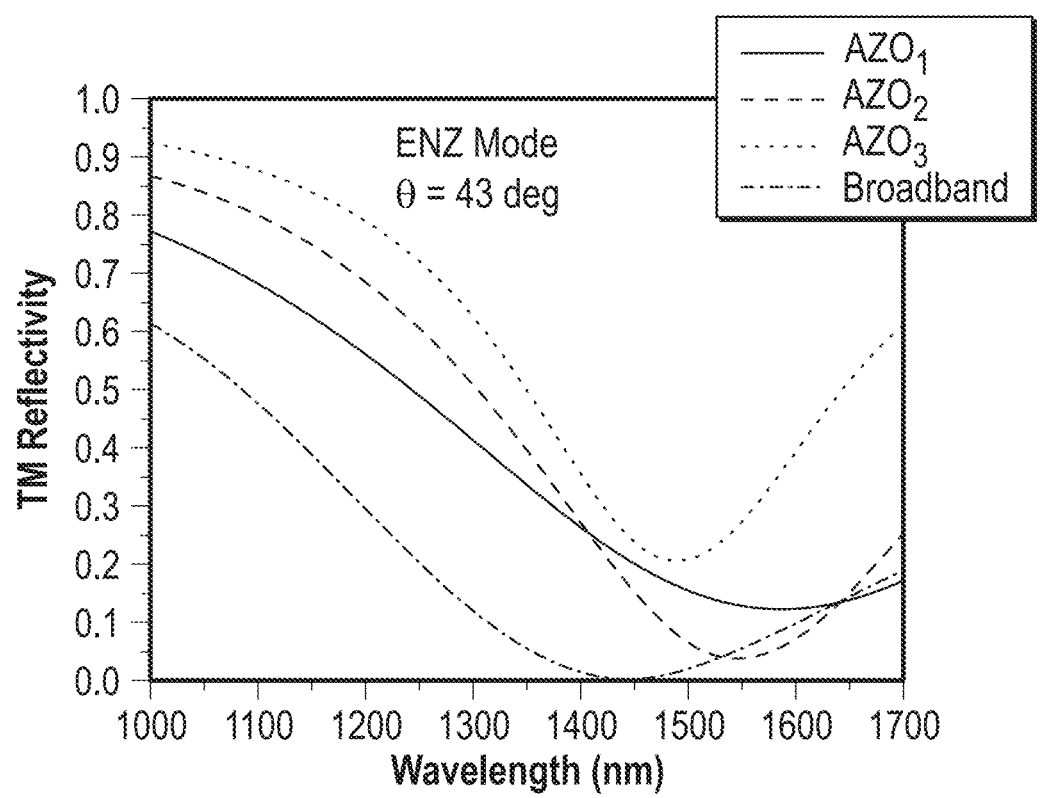
FIG. 8C is a schematic graph of calculated TM reflectivities of the AZO multilayers in the ENZ mode configuration of FIG. 7C.

FIG. 8A is a schematic graph of wavelength dependence of the real and imaginary parts of permittivity of each single AZO layer deposited at 250° C. obtained by ellipsometry shown in FIGS. 7A-7C. FIG. 8B is a schematic graph of calculated p-polarized (TM) reflectivities of the AZO multilayers with broadband ENZ absorptance in the Berreman mode configuration of FIG. 7B. FIG. 8C is a schematic graph of calculated TM reflectivities of the AZO multilayers with broadband ENZ absorptance in the ENZ mode configuration of FIG. 7C. The dotted lines show the reflectivities of each of the individual AZO nanolayers with thicknesses equal to the layers in the designed multilayer stacks. The reflectivities are shown at an angle of incidence of 43°, which is above the critical angle of total internal reflection of 41.8°. To achieve broadband absorption, a parametric sweep is used to optimize the thicknesses of three AZO layers. At an angle of incidence of 43°, the optimum thicknesses (for the bottom, central and top layers) are 80, 60, and 50 nm for the Berreman mode and 80, 60, and 30 nm for the ENZ mode. As shown in FIGS. 8B and 8C, the minimum in reflectivity is due to the resonant light absorption by the ENZ modes. The bandwidth of absorption (>90%) at 43° is 214 nm for Berreman mode and 294 nm for ENZ mode in near-infrared region.

Figure 9A:
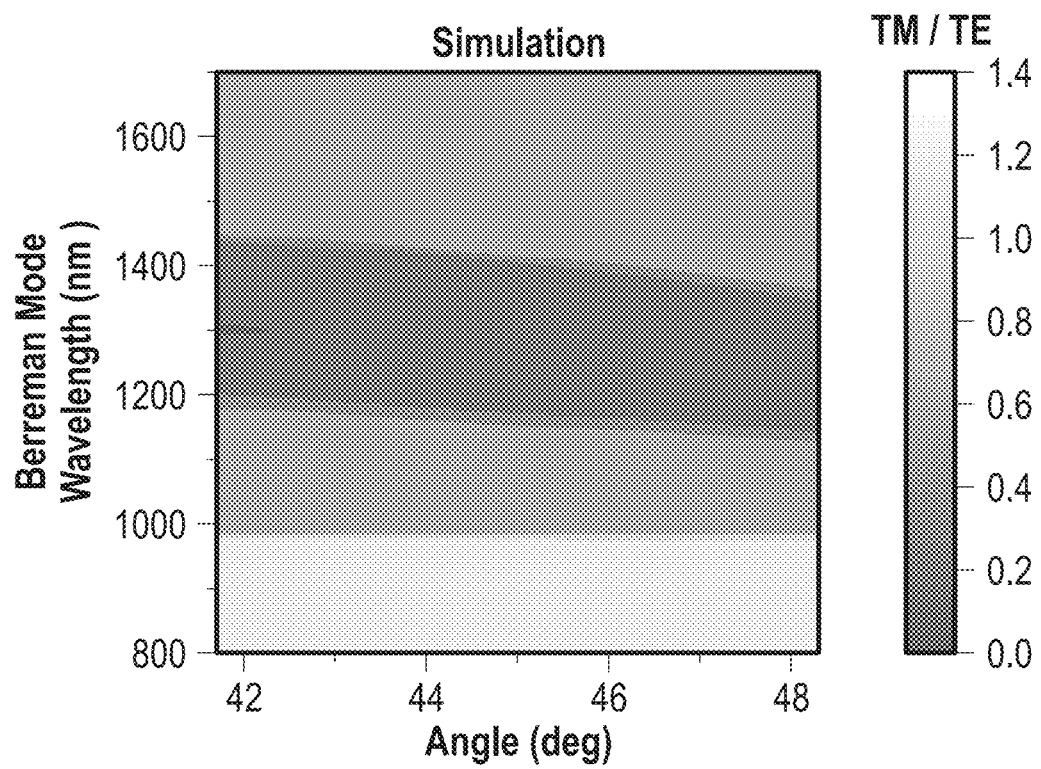
FIG. 9A is a schematic graph of a simulated ratio of TM and s-polarized (TE) reflectivity in the Kretschmann-Raether configuration for the broadband AZO absorber with a Berreman mode configuration.
Figure 9B:
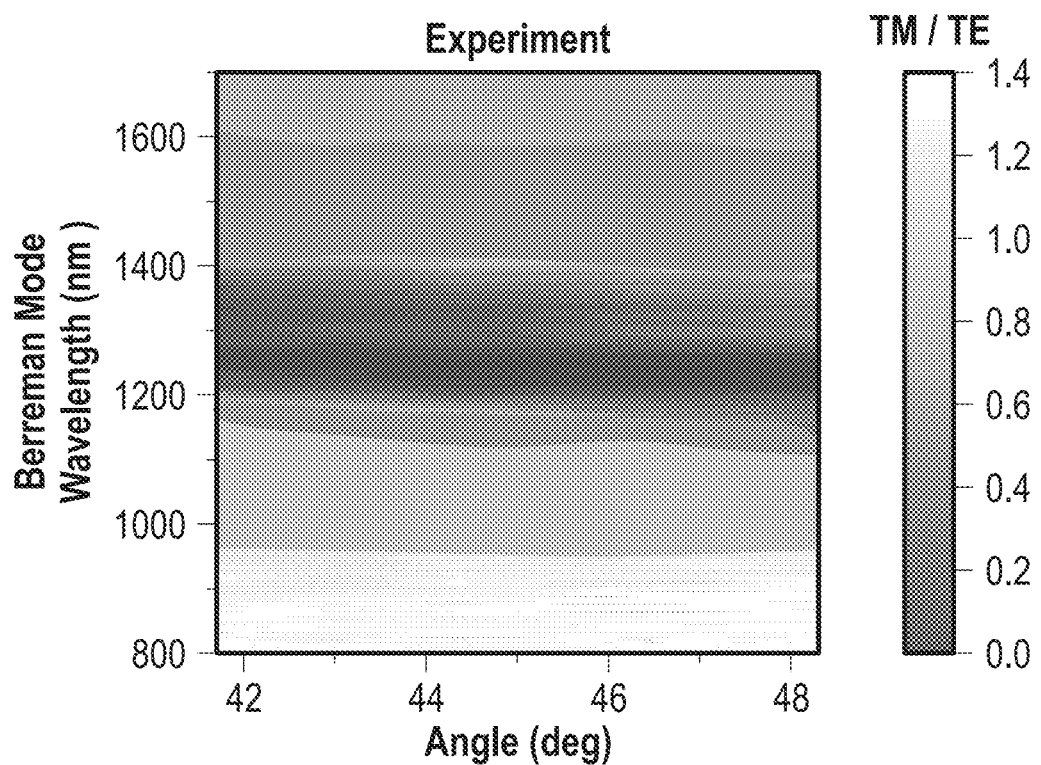
FIG. 9B is a schematic graph of an experimentally determined ratio of TM and TE reflectivity in the Kretschmann-Raether configuration for the broadband AZO absorber with a Berreman mode configuration.

FIG. 9A is a schematic graph of a simulated ratio of TM and s-polarized (TE) [reflectivity in the Kretschmann-Raether configuration for the broadband AZO absorber with a Berreman mode configuration. FIG. 9B is a schematic graph of an experimentally determined ratio of TM and TE reflectivity in the Kretschmann-Raether configuration for the broadband AZO absorber with a Berreman mode configuration. FIG. 9A is a schematic graph of a simulated ratio of TM and TE reflectivity in the Kretschmann-Raether configuration for the broadband AZO absorber with an ENZ mode configuration. FIG. 9B is a schematic graph of an experimentally determined ratio of TM and TE reflectivity in the FIG. 6B is a schematic graph of measured and simulated dispersion characteristics of the Berreman mode in a 15 nm thin ITO nanolayer.

Figure 9C:
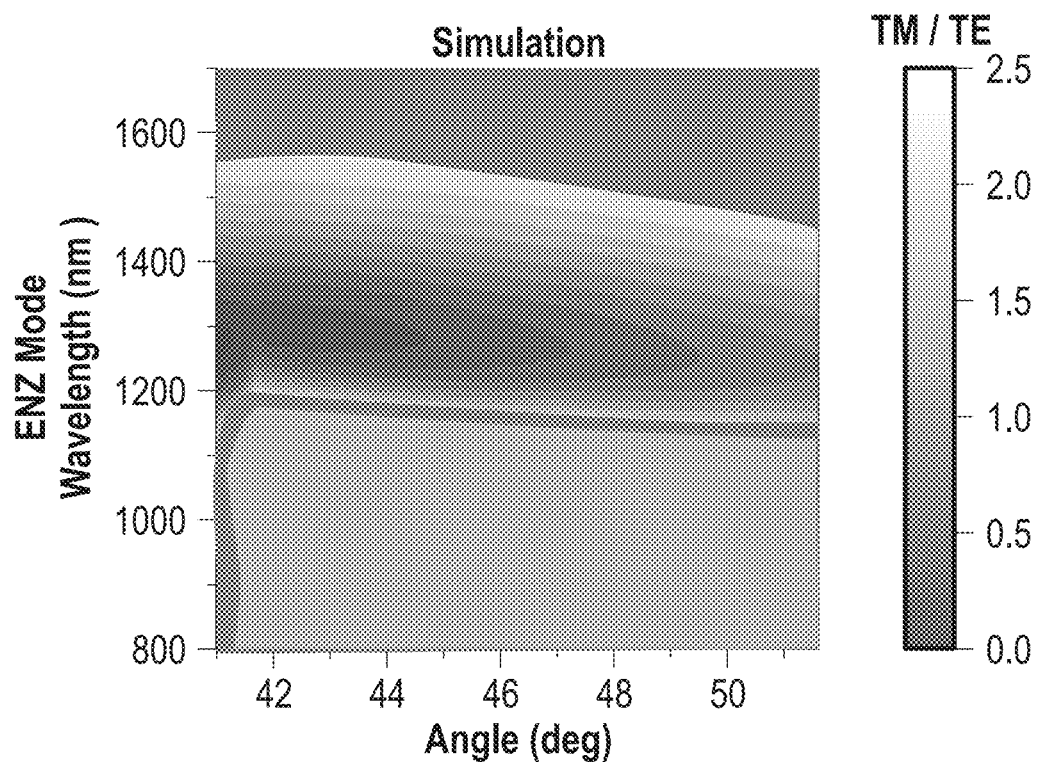
FIG. 9C is a schematic graph of a simulated ratio of TM and TE reflectivity in the Kretschmann-Raether configuration for the broadband AZO absorber with an ENZ mode configuration.
Figure 9D:
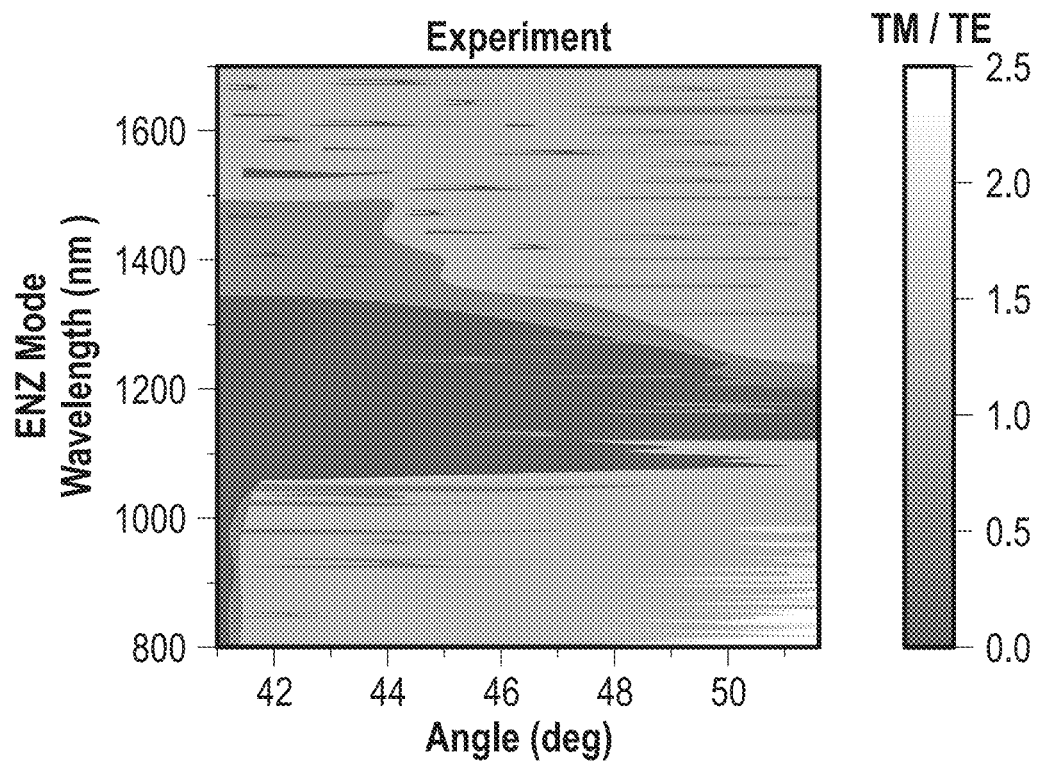
FIG. 9D is a schematic graph of an experimentally determined ratio of TM and TE reflectivity in the Kretschmann-Raether configuration for the broadband AZO absorber with an ENZ mode configuration.

TE and TM reflectivity spectra were measured in the Kretschmann-Raether configuration for a range of incidence angles of 41°-52°. The TM/TE reflectivity ratio was calculated and compared with the ratio of simulated reflectivities. The simulation takes into account the real thicknesses and optical properties of the constituent AZO layers of the multilayer stack measured by ellipsometry on control samples. The comparison shows a good agreement between the measured and simulated results. The AZO layer thicknesses were 82 nm, 57 nm, and 57 nm for the AZO1, AZO2, and AZO3, respectively. The critical angle of total internal reflection of 41.8° is visible in FIGS. 9C and 9D. The figures shows a good agreement between simulated and measured results.

Example 5

FIG. 10 is a schematic graph of an electron density at an oxide-ITO interface of four combinations of a simulated MOS field-effect perfect absorber at an applied bias. In this example, the applied bias is 5 V. The ITO bulk electron density is $1\times10^{21}$ cm$^{-3}$. The MOS structures are: solid line—Ag-HfO2-ITO, dash line—Au-HfO2-ITO, dot line—Au-Al2O3-ITO, and dash-dot line—Cu-HfO2-ITO. The work functions of the metals are: silver 4.26 eV, gold 5.1 eV, and copper 4.65 eV. The dielectric constant of hafnium dioxide is 25 and the dielectric constant of aluminum oxide is 9.

Other and further embodiments utilizing one or more aspects of the inventions described above can be devised without departing from the disclosed invention as defined in the claims. For example, various ENZ materials other than TCO materials, layers with different ENZ materials or ENZ layers with different doping metals or semi-metals for different ENZ regimes of permittivity, levels of doping, applied electrical bias levels, thicknesses, levels of doping as a percentage between layers, and other variations can occur in keeping within the scope of the claims, and other variations.

The invention has been described in the context of preferred and other embodiments, and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. An electronic device, comprising:
    at least one layer of a conducting material having a thickness relative to a thickness of a space charge region for the conducting material that is configured to create an epsilon-near-zero (ENZ) regime of permittivity of perfect absorption at a given wavelength from incidence light from a single direction and configured to be tunable to vary the permittivity with applied electrical bias,
    wherein the at least one layer of the conducting material having the thickness relative to the thickness of the space charge region comprises a 8:1 ratio or less.

2. The device of claim 1, wherein conducting material comprises at least one partially transparent semiconductor material doped with a metal or semi-metal to form a carrier concentration in the material for the epsilon-near-zero (ENZ) regime of permittivity.

3. The device of claim 1, wherein the semiconductor material comprises at least one layer of at least one of a transparent conducting oxide ("TOO") material or a transition metal nitride material.

4. The device of claim 1, wherein the device comprises at least two layers with different carrier concentrations.

5. The device of claim 1, wherein the device comprises at least two layers with different ENZ regimes.

6. The device of claim 1, further comprising an oxide layer coupled to the at least one layer, and a metal layer coupled to the oxide layer distal from the at least one layer to form metal oxide semiconductor (MOS) configuration.

7. The device of claim 6, wherein the MOS configuration is tunable to absorb frequencies of light by application of electrical bias to the MOS configuration.

8. The device of claim 1, wherein the device further comprises a metal reflector coupled to the at least one layer.

9. The device of claim 1, wherein the device further comprises a high-index material configured to receive light prior to the at least one layer.

10. An electronic device, comprising:
    a stack of a plurality of conducting layers having an epsilon-near-zero (ENZ) regime of permittivity at a given wavelength with at least two of the layers having different ENZ regimes and configured to absorb light at different frequencies, at least one of the plurality of conducting layers having a thickness relative to a thickness of a space charge region for the conducting material that is configured to create an epsilon-near-zero (ENZ) regime of permittivity of perfect absorption at a given wavelength of light from a single direction and configured to be tunable to vary the permittivity with applied electrical bias
    wherein the at least one of the plurality of conducting layers having the thickness relative to the thickness of the space charge region comprises a 8:1 ratio or less.

11. The device of claim 10, wherein at least one of the plurality of layers comprises a semiconductor material doped with at least one metal or semi-metal to form a carrier concentration.

12. The device of claim 10, wherein the device is tunable to different permittivities by application of electrical bias to the device.

13. The device of claim 10 wherein the device further comprises a metal reflector coupled to the at least one layer.

14. The device of claim 10 wherein the device further comprises a high-index material configured to receive light prior to the at least one layer.

15. The device of claim 10, further comprising an oxide layer coupled to the at least one layer, and a metal layer coupled to the oxide layer distal from the at least one layer to form metal oxide semiconductor (MOS) configuration.

16. The device of claim 15, wherein the MOS configuration is tunable to absorb different frequencies of light by application of electrical bias to the MOS configuration.

17. A method of using an electronic device having at least one layer of a conducting material having a thickness relative to a thickness of a space charge region for the conducting material that is configured to create an epsilon-near-zero (ENZ) regime of permittivity of perfect absorption at a given wavelength, wherein the at least one layer of the conducting material having the thickness relative to the thickness of the space charge region comprises a 8:1 ratio or less, the method comprising:

applying electrical bias to the device; and tuning the device to absorb various frequencies of light.

18. The method of claim 17, wherein at least one layer comprises semiconductor material doped with a metal or semi-metal to form a carrier concentration in the material for an epsilon-near-zero (ENZ) regime of permittivity of perfect absorption at a given wavelength.

19. The method of claim 17, wherein the device comprises at least two layers with different ENZ regimes, and further comprising absorbing different frequencies of incidence light passing through the at least two layers.

20. The device of claim 1, wherein the at least one of the plurality of conducting layers having the thickness relative to the thickness of the space charge region comprises a 5:1 ratio or less.

21. The device of claim 10, wherein the at least one of the plurality of conducting layers having the thickness relative to the thickness of the space charge region comprises a 5:1 ratio or less.

* * * * *